US006290363B1

(12) United States Patent
Masutani

(10) Patent No.: US 6,290,363 B1
(45) Date of Patent: Sep. 18, 2001

(54) APPARATUS FOR REFLECTING LIGHT AND CHANGING THE LENGTH OF OPTICAL PATH

(75) Inventor: Koji Masutani, Hamura (JP)

(73) Assignee: S.T. Japan Inc., Tokyo (JP)

( * ) Notice: Subject to any disclaimer, the term of this patent is extended or adjusted under 35 U.S.C. 154(b) by 0 days.

(21) Appl. No.: 09/502,335

(22) Filed: Feb. 11, 2000

(30) Foreign Application Priority Data

Feb. 15, 1999 (JP) ........................................ 11-035626

(51) Int. Cl.[7] .............................. G02B 5/08; G02B 7/182
(52) U.S. Cl. ........................... 359/856; 359/199; 359/214
(58) Field of Search .................................... 359/856, 862, 359/871, 873, 198, 199, 212, 213, 214

(56) References Cited

U.S. PATENT DOCUMENTS 3,642,343 * 2/1972 Tchejayan et al. .................. 359/210

* cited by examiner

*Primary Examiner*—Audrey Chang
*Assistant Examiner*—Mark A. Robinson
(74) *Attorney, Agent, or Firm*—Mattingly, Stanger & Malur, P.C.

(57) ABSTRACT

An apparatus for reflecting a light and changing the length of an optical path from a beam splitter to a light reflecting member, and back to the beam splitter, on a cycle at a high speed, includes a beam splitter and at least one light reflecting member that reflects one of the emerged lights from the beam splitter and reenters the light in the beam splitter, the light reflecting member being supported so as to perform a circular locus motion with the orientation of the light reflecting member being constant. The circular locus motion includes a motion in which the light reflecting member is moved in a distance direction with respect to the beam splitter. The light reflecting member is provided with a turning effect, which is converted into a circular locus motion to make the light reflecting member perform the circular locus motion.

8 Claims, 28 Drawing Sheets

4 7 8 4a 13 14 16a A 12a 12 8 5 2 11 14 16b 13 18 17 3a 7 3 22 1 21a 21

APPARATUS FOR REFLECTING LIGHT AND CHANGING THE LENGTH OF OPTICAL PATH

TECHNICAL FIELD

The present invention relates to an apparatus for reflecting light and increasing or decreasing the length of an optical path. Specifically, the invention relates to an apparatus in which when an optical beam enters a beam splitter, the incident light is splitted into two kind of lights (reflecting light and transmitting light) and caused to emerge; one of the emerged lights (transmitted light) is reflected by a plurality of light reflecting mirrors, and reentered in the splitter in the direction opposite to the emerging direction of the emerged light; the optical path (length of reciprocating optical path) from the point where the light emerges from the splitter to the point where the emerged light from the splitter is reflected by a plurality of the light reflecting mirrors, and finally to the point where the light is reentered in the splitter is increased or decreased on a cycle.

Accordingly, the apparatuses of the present invention can be used as moving mirrors in conventional Michelson interferometers used in FT-IR (Fourier-transform Infrared Spectroscopy).

Further, the present invention is concerned with an apparatus for moving (a) a light reflecting member, and (b) a device for changing the length of an optical path using the apparatus for moving a light reflecting member.

Hereinafter the term “increasing or decreasing” is sometimes referred to as “changing” for brevity, and the words “for reflecting a light and changing the length of an optical path” is sometimes condensed into “for changing the length of an optical path”)

BACKGROUND ART

In FT-IR, a Michelson interferometer has generally been used. The Michelson interferometer is composed of a beam splitter and two light reflecting systems. FIG. 27 schematically shows the structure of a general purpose Michelson interferometer.

In FIG. 27, a Michelson interferometer is provided with beam splitter 01 having a transmittance of 50%, fixed mirror M0 placed so as to face to the beam splitter 01 at a prescribed angle θ (45°), and moving mirror M1. The interferometer is fabricated such that when the light which was emerged from measuring light source 02 is converted by collimator 03 into a beam of parallel lights and then enters the beam splitter 01 described above, half of the optical beam is reflected by beam splitter 01 and reaches fixed mirror M0, remaining half of the optical beam passes through beam splitter 01 to reach moving mirror M1, and each of the beams reached mirror M0 and mirror M1 is reflected by them, reenters beam splitter 01, and then collected at detector 05 through condenser lens 04, respectively.

In this case, the two kind of lights interfere to mutually amplify or attenuate (interference action of light) due to twofold difference (difference in optical path) between the distance L0 from beam splitter 01 to fixed mirror M0 and the distance LI from the beam splitter 01 to moving mirror M1. Thus, when moving mirror M1 is reciprocated in parallel to beam splitter 01, twofold value of the moved distance is plotted as abscissa, and the out put from detector 05 is recorded as ordinate, then the interferogram of measuring light (interference waveform) based on the interference action of the lights described above can be obtained. The interferogram is determined and then subjected to Fourier transformation to obtain a spectrum.

In conventional apparatuses for changing the length of an optical path on a cycle in which the length of an optical path of an optical beam from the point where an optical beam emerges from a beam splitter to the point where the optical beam is reflected by a moving mirror, and finally to the point where the reflected optical beam reenters the beam splitter is changed on a cycle by moving the moving mirror, a linear driving mechanism such as a linear ball bearing or a rotational driving mechanism such as a rotary bearing has been used as mechanism for varying the difference in the optical path described above.

FIGS. 28A to 28D schematically show apparatuses for moving a moving mirror (apparatus for moving a light reflecting member) used in conventional interferometers. FIG. 28A is an illustration of an example of conventional apparatuses using a linear driving mechanism. FIG. 28B is an illustration of a sort of prior art technology using a mechanism by which a moving mirror is reciprocated in a prescribed angular range. FIG. 28C is an illustration of another sort of prior art technology using a mechanism by which a moving mirror is reciprocated in a prescribed angular range in a manner different from that of FIG. 28B. FIG. 28D is an illustration of still another sort of prior art technology using a rotational driving mechanism.

In FIG. 28A, supporting member S which supports moving mirror M1 is slidably supported by a guide member. Rack R formed on supporting member S is engaged with gear G. Gear G is reciprocated with a motor (not shown in the drawing) in the range of a prescribed angle, and thus the moving mirror M1 linearly reciprocates in a direction along the incident light.

In FIG. 28B, supporting member S which supports moving mirror M1 is rotatably connected to the free end of swingable parallel links, A1 and A2. Gear G is attached to rotation axis A1*a* of one side of the parallel links, A1. Gear G is reciprocated with a motor (not shown in the drawing) in a prescribed angular range, and thus the moving mirror M1 linearly reciprocates in a direction along the incident light.

In FIG. 28C, moving mirror M1, and moving mirror M0' which is a substitute for a fixed mirror are supported at the ends of lever L having rotation axis La. Gear G is attached to the rotation axis La. Gear G is reciprocated with a motor (not shown in the drawing) in the range of a prescribed angle. Thus, the moving mirrors M1 and M0' simultaneously swing, and a difference in the length of optical path (difference in an optical path) from the point where a transmitting light and a reflecting light splitted by beam splitter B are caused to emerge to the points where the lights are reflected by the moving mirrors M1 and M0', and finally to the point where the reflected lights reenter beam splitter B, respectively, is produced.

However, the apparatuses shown in FIGS. 28A to 28C have such problems as follows:

In the conventional technology using any one of the apparatuses shown in FIGS. 28A to 28C, it is necessary to reciprocate gear G in the range of a prescribed angle. Accordingly, it is required to once stop the rotational movement of the gear G every time the motion of the gear comes to both ends in the prescribed angle described above and then start the motion in the opposite direction. Thus, it is difficult to make the moving mirror perform a reciprocation at a high speed by a method wherein rotation of the gear is stopped every time it comes up to both ends of the prescribed angle (a method wherein a moving mirror is once stopped at both ends of its moving range, and then the moving of the mirror is started).

FIG. 28D shows a method which has been conducted by Dr.

Griffith of America who is studying on interferometers intended for high speed moving of moving mirrors (that is, interferometers of which the cycle of increasing or decreasing the length of a reciprocative optical path described above is shortened). In FIG. 28D, moving mirror M1 rotates at a high speed together with supporting member S which supports the mirror M1. At that time, the normal of the mirror surface is inclined toward the rotation axis. During a scanty period of time when the moving mirror described above is in the range of a prescribed rotation angle, light L1 which is incident on moving mirror M1 is reflected by moving mirror M1, reflected by mirror M2, M1, M3, M1, M2, and M1 in turn, and then reentered in a beam splitter (not shown in the drawing). The reincident light which reenters the beam splitter can be obtained only during a scanty period of time when the moving mirror M1 is in the range of a prescribed rotation angle. When the moving mirror is in an angular range outside the prescribed one, measuring becomes impossible.

In this case, there exist such defects that the time in which measuring is actually possible is extremely limited and that the optical path difference can not be made large.

BRIEF DESCRIPTION OF THE DRAWINGS

FIG. 3A is the cross-sectional view taken along the line IIIA—IIIA of FIG. 2. FIG. 3B is an illustration of the relation between cam fitting hole 13*a* of a light reflecting member and eccentric cam 8*a* of an eccentric cam shaft viewed along the line IIIB—IIIB in FIG. 2. FIGS. 3C and 3D are illustrations showing modifications of the cam fitting hole and eccentric cam shown in FIG. 3B.

FIG. 6A is a side view of the frame viewed from the same direction as in FIG. 1, FIG. 6B is the plane view of the frame viewed from the direction of arrow VIB in FIG. 6A, and FIG. 6C is the front view of the frame viewed from the direction of arrow VIC in FIG. 6A.

FIGS. 7A to 7C are illustrations of the eccentric cam shaft viewed from the same direction as in FIG. 1, from the direction of arrow VIIB in FIG. 7A, and from the direction of arrow VIIC in FIG. 7A, respectively.

FIGS. 8A to 8C are illustrations of the first light reflecting member viewed from the same direction as in FIG. 1, from the direction of arrow VIIIB in FIG. 8A, and from the direction of arrow VIIIC in FIG. 8A, respectively.

FIG. 9A is a side view of the balancer viewed from the same direction as in FIG. 1 and FIG. 9B is the plane view of the balancer viewed from the direction of arrow IXB in FIG. 9A.

FIG. 10A shows the front view of a light reflecting mirror of a first light reflecting member (view of a first light reflecting member viewed from the direction to which the emerged light from a beam splitter enters a first light reflecting member). FIGS. 10B and 10C are views of the mirror viewed from the direction of arrow XB in FIG. 10A and from the direction of arrow XC in FIG. 10A, respectively.

FIG. 11A illustrates the positional relation between a light reflecting mirror and an eccentric axis. FIG. 11B is an illustration of a motion subordinate to an eccentric rotation of light reflecting mirrors of a first light reflecting member.

FIG. 12 A is an oblique view showing the positional relation of a light reflecting mirror and an eccentric axis. FIG. 12B is an illustration of a motion subordinate to an eccentric rotation of light reflecting mirrors of a first light reflecting member.

FIG. 13A is the front view of light reflecting mirrors of a first light reflecting member (view of a first light reflecting member viewed from the direction to which the emerged light from a beam splitter enters the first light reflecting member). FIGS. 13B and 13C are views of the mirrors viewed from the direction of arrow XIIIB in FIG. 13A and from the direction of arrow XIIIC in FIG. 13A, respectively.

FIG. 18A shows an example of the apparatuses having first light reflecting member 11 composed of a vertical arrangement type roof mirror (roof mirror in which a pair of mirrors are arranged above and below) and second light reflecting member 23' composed of a plane mirror. FIG. 18B shows an example of the apparatuses having first light reflecting member 11 composed of vertical arrangement type roof mirror, second light reflecting member 23 composed of a horizontal arrangement type roof mirror (roof mirror in which a pair of mirrors are arranged from side to side), and third light reflecting member 24 composed of a plane mirror. FIG. 18C shows an example of the apparatuses having first light reflecting member 11 composed of a vertical arrangement type roof mirror, second light reflecting member 23" composed of a corner mirror, and third light reflecting member 24 composed of a plane mirror.

FIG. 19A shows an example of the apparatuses having first light reflecting member 11 composed of a horizontal arrangement type roof mirror and second light reflecting member 23' composed of a plane mirror. FIG. 19B shows an example of the apparatuses having first light reflecting member 11 composed of a horizon arrangement type roof mirror, second light reflecting member 23 composed of a horizon arrangement type roof mirror, and third light reflecting member 24 composed of a plane mirror. FIG. 19C shows an example of the apparatuses having first light reflecting member 11 composed of a horizontal arrangement type roof mirror, second light reflecting member 27 composed of a vertical arrangement type roof mirror, and third light reflecting member 24 composed of a plane mirror. FIG. 19D shows an example of the apparatuses having first light reflecting member 11 composed of a horizontal arrangement type roof mirror, second light reflecting member 23" composed of a corner mirror, and third light reflecting member 24 composed of plane mirror.

FIG. 20A is a drawing illustrating three examples of the apparatuses which have first light reflecting member 11" composed of a plane mirror and second light reflecting member 23' composed of a plane mirror; in which apparatuses the direction of rotation axis of the first mirror is different from one another. FIG. 20B is a drawing illustrating three examples of the apparatuses which have first light reflecting member 11" composed of a plane mirror, second light reflecting member 23 composed of a horizon arrangement type roof mirror, and third light reflecting member 24 composed of a plane mirror; in which apparatuses the direction of rotation axis of the first mirror is different from one another.

FIG. 20C is a drawing illustrating three example of the apparatuses which have first light reflecting member 11" composed of a plane mirror, second light reflecting member 23" composed of a corner mirror, and third light reflecting member 24 composed of a plane mirror; in which apparatuses the direction of rotation axis of the first mirror is different from one another.

FIG. 21A shows an example of the apparatuses having first light reflecting member 11 composed of a vertical arrangement type roof mirror and second light reflecting member 23 composed of a vertical arrangement type roof mirror. FIG. 21B shows an example of the apparatuses having first light reflecting member 11 composed of a vertical arrangement type roof mirror and second light reflecting member 23 composed of a horizontal arrangement type roof mirror. FIG. 21C shows an example of the apparatuses having first light reflecting member 11 composed of a vertical arrangement type roof mirror and second light reflecting member 23" composed of a corner mirror. FIG. 21D shows an example of the apparatuses having first light reflecting member 11 composed of a horizontal arrangement type roof mirror and a second light reflecting mirror 23 composed of a vertical arrangement type roof mirror.

FIG. 22A shows an example of the apparatuses in which only light reflecting member 11" composed of a plane mirror is used. FIG. 22B is an example of the apparatuses in which only light reflecting member 11 composed of a vertical arrangement type roof mirror is used.

FIG. 25A is the plane view, and FIG. 25B is the front view of the apparatus viewed from the direction of arrow XXVB in FIG. 25A.

FIG. 28A is an illustration of an example of conventional apparatuses using a linearly driving mechanism. FIG. 28B is an illustration of a sort of conventional technology using a mechanism which reciprocates a moving mirror in the range of a prescribed angle. FIG. 28C is an illustration of another sort of conventional technology which is different from FIG. 28B and uses a mechanism which reciprocates a moving mirror in the range of a prescribed angle. FIG. 28D is an illustration of still another sort of conventional technology using a rotational driving mechanism.

Figure 1:
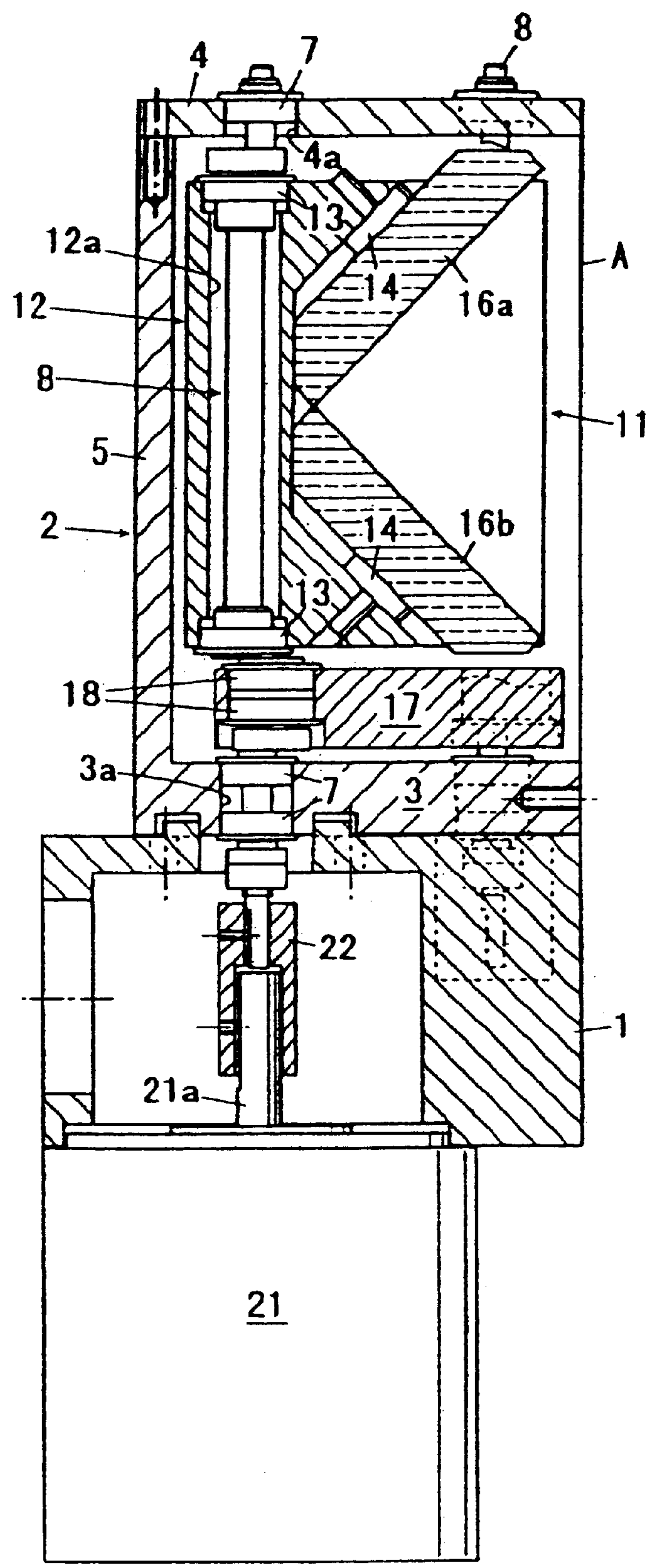
FIG. 1 is an illustration of a first light reflecting member in the apparatus of the present invention in Example 1 for reflecting a light and changing the length of an optical path on a cycle, and its whole driving mechanism.

In the Figures, the following main symbols express the meaning shown below:

B . . . beam splitter,

8 . . . eccentric cam shaft,

8*a*, 8*a*', 8*b* . . . eccentric cam,

11', 11, 11", 23, 23', 23", 24 . . . light reflecting member,

16*a*, 16*b*, 16*a*', 16*b*', 16*c*' . . . light reflecting mirror,

13*a*, 13*a*' . . . cam fitting hole,

21 . . . rotational driving apparatus (cam shaft rotational driving apparatus),

7, 8, 13; 28 to 31; 28', 29, 31 to 32 . . . means for converting a turning effect into a circular locus motion with the orientation of the light reflecting member constant.

DISCLOSURE OF THE INVENTION

In view of the problems described above, the present invention is to provide particularly an apparatus in which the length of an optical path from the point where an incident light is splitted into a reflecting light and a transmitting light by a beam splitter and caused to emerge, to the point where one of the lights (transmitting light) is reflected by a light reflecting member, and finally to the point where the reflected light reenters the beam splitter can be increased or decreased on a cycle at a high speed.

Now, the present invention is more specifically described with reference to the following discussions divided into four aspects. In the following discussions, parts, members, and means used in the apparatuses of the present invention are shown together with the specific symbols used in the Examples described below with the symbols being parenthesized, in order to facilitate the correspondence between the parts, members, and means in the discussions and those in the Examples thereby to expedite the understanding to the invention. Accordingly, the scope of the invention is by no means limited to the Examples.

(First Aspect)

Apparatus of a first aspect of the present invention for changing the length of an optical path is particularly characterized by having the following requirements (A01) to (A03):

An apparatus for Reflecting a Light Comprising (A01) at least one light reflecting member (11, 23, 24; 11', 23, 24) having one or more mirrors (16*a*, 16*b*; 16*a*', 16*b*', 16*c*') to reflect an incident light, and supported so as to perform a circular locus motion with the orientation of the light reflecting member being constant, the circular locus motion includes a motion in which the light reflecting member (11, 23, 24; 11', 23, 24) is moved in a distance direction (receding direction and approaching direction) to the incident light, (A02) means (21) for generating a turning effect for moving the light reflecting member, and (A03) means (7, 8, 13; 28 to 31; 28', 29, 31 to 32) for converting turning effect into circular locus motion to make the light reflecting member (11, 23, 24; 11', 23, 24) perform the circular locus motion with the orientation of the light reflecting member being constant, by the turning effect.

(Function of the Apparatus of a First Aspect)

In the apparatus of a first aspect of the present invention having such requirements as described above, at least one light reflecting member (11, 23, 24; 11', 23, 24) having one or more mirrors (16*a*, 16*b*; 16*a*', 16*b*', 16*c*') to reflect the incident light (emerged light from a beam splitter) is supported so as to perform a circular locus motion with the orientation of the light reflecting member (11, 23, 24; 11', 23, 24) being constant (hereinafter sometime referred to as "constant orientation, circular locus motion".) The light reflecting member is also supported such that the constant orientation, circular locus motion includes a motion in which the light reflecting member is moved in a distant direction (receding direction and approaching direction) to the incident light.

Rotational driving means (apparatus) (21) generates a turning effect for moving the light reflecting member. Means (7, 8, 13; 28 to 31; 28', 29, 31 to 32) for converting turning effect into circular locus motion make the light reflecting member (11, 23, 24; 11', 23, 24) perform the constant orientation, circular locus motion.

Since the constant orientation, circular locus motion includes a motion in which the light reflecting member (11, 23, 24; 11', 23, 24) is moved in a distant direction to the incident light, the light reflecting member can be reciprocated in a direction along the incident light to the light reflecting member. Thus, the length of the optical path of the incident light and the reflected light described above can be varied.

(Second Aspect)

An apparatus of a second aspect of the present invention for changing the length of an optical path is particularly characterized by having the following requirements (B01) to (B03):

(B01) at least one light reflecting member (11, 23, 24; 11', 23, 24) having one or more mirrors (16*a*, 16*b*; 16*a*', 16*b*', 16*c*40 ) to reflect an incident light in which member a hole (13*a*; 13*a'*) used for fitting a cam and having a center line extending in the direction crossing the optical axis of the incident light is formed, (B02) an eccentric cam shaft (8) having an eccentric cam (8*a*, 8*b*; 8*a* ) supported so as to be rotatable around an axial line which is eccentric from the center line by a prescribed eccentric distance of r, and rotatably fitted in the hole (13*a*; 13*a'*) used for fitting the cam, and (B03) means (21) for rotating the eccentric cam shaft (8), the eccentric cam (8*a*, 8*b*; 8*a*') is fitted in the hole (13*a*; 13*a'*) such that the light reflecting member (11, 23, 24; 11', 23, 24) performs a motion (motion subordinate to eccentric rotation) including a reciprocating motion of a prescribed stroke in the direction of the incident light with the orientation of the light reflecting member is constant, when the eccentric cam shaft is continuously rotated.

(Function of the Apparatus of a Second Aspect)

In the apparatus of a second aspect of the present invention having such requirements as described above, a hole (13*a*; 13*a'*) used for fitting a cam and having a center line extending in the direction which cross the optical axis of the incident light is formed in at least one light reflecting member (11, 23, 24; 11', 23, 24) having one or more mirror (16*a*, 16*b*; 16*a*', 16*b*', 16*c'*) to reflect the incident light. Eccentric cam (8*a*, 8*b*; 8*a'*) of an eccentric cam shaft (8) which is rotatable around the axial line which is eccentric by a prescribed eccentric distance of r from the center line rotatably fits in the cam fitting hole (13*a*; 13*a'*). Means (apparatus) (21) for rotationally driving the cam rotates the eccentric cam shaft (8).

When eccentric cam shaft (8) rotates around the axial line which is eccentric from the center of the cam fitting hole (13*a*; 13*a'*), eccentric cam (8*a*, 8*b*; 8*a'*) rotates (eccentrically rotates) around the axial line which is eccentric from the center by an eccentric distance of r. At least one light reflecting member (11, 23, 24; 11', 23, 24) in which a cam fitting hole (13*a*; 13*a'*) is formed performs a motion (motion subordinate to eccentric rotation) including a reciprocating movement having a prescribed stroke in the direction of the incident light with the orientation of the light reflecting member being constant in accordance with the eccentric rotation of eccentric cam (8*a*, 8*b*; 8*a'*) fitting in the cam fitting hole (13*a*; 13*a'*).

In this case, when the direction of the incident light to the light reflecting member (11, 11') is perpendicular to the eccentric axial line and if the eccentric distance is r, then the stroke of the distance of reciprocating movement in the direction along the optical path of the incident light to the light reflecting member (11, 23, 24; 11', 23, 24) becomes 2r.

When the light reflecting member (11, 23, 24; 11', 23, 24) is reciprocatively moved in the direction along the incident line to the light reflecting member by a stroke of 2r, the length of the optical path of the incident light and reflected light can be varied.

The motion subordinate to eccentric rotation described above is a motion accompanied by a continuous rotation of the eccentric cam shaft. Accordingly, the motion subordinate to eccentric rotation is a continuous motion which does not stop at both ends of the stroke 2r in the direction along the incident light, and thus a high speed motion become possible. Therefore, it becomes possible to provide an apparatus which is used for increasing or decreasing the length of an optical path on a cycle and can be operated at a high speed.

(Third Aspect)

An apparatus of a third aspect of the present invention for changing the length of an optical path on a cycle is particularly characterized by having the following requirements (C01) to (C04):

(C01) a beam splitter (B) for splitting an incident light into a reflecting light and a transmitting light, and causing both of the lights to emerge, (C02) at least one light reflecting member (11, 23, 24; 11', 23, 24) to reflect one of the emerged lights (transmitted light) from the beam splitter (B) and to reenter the light in the beam splitter (B) in the direction opposite to the emerging direction of the emerged light, the light reflecting member (11, 23, 24; 11', 23, 24) is supported so as to perform a circular locus motion with the orientation of the light reflecting member being constant, the circular locus motion includes a motion in which the light reflecting member (11, 23, 24; 11', 23, 24) is moved in a distance direction (receding direction and approaching direction) to the beam splitter (B), (C03) means (apparatus) (21) for generating a turning effect for moving the light reflecting member, and (C04) means (7, 8, 13; 28 to 31; 28', 29, 31 to 32) for converting turning effect into circular locus motion to make the light reflecting member (11, 23, 24; 11', 23, 24) perform a circular locus motion with the orientation of the light reflecting member being constant, by the turning effect.

(Function of the Apparatus of a Third Aspect)

In the apparatus of a third aspect of the present invention having such requirements as described above, a beam splitter (B) splits an incident light into a reflecting light and a transmitting light, and make causes the two kind of lights to emerge. At least one light reflecting member (11, 23, 24; 11', 23, 24) of the apparatus reflects one of the emerged lights (transmitted light), and reenter the reflected light in the beam splitter (B) in the direction opposite to the emerging direction of the emerged light.

The light reflecting member (11, 23, 24; 11', 23, 24) is supported so as to perform the constant orientation, circular locus motion. The circular locus motion of the light reflecting members (11, 23, 24; 11', 23, 24) described above includes a motion in which the light reflecting member reciprocatively moves in a distant direction (receding direction and approaching direction) to the beam splitter (B).

Means (apparatus) (21) generates a turning effect for moving the light reflecting member. Means (7, 8, 13; 28 to 31; 28', 29, 31 to 32) for converting turning effect into circular locus motion with the orientation of the light reflecting member being constant make the light reflecting member (11, 23, 24; 11', 23, 24) perform the constant orientation, circular locus motion.

Since the constant orientation, circular locus motion includes a motion in which the light reflecting member reciprocatively moves in a distant direction (receding direction and approaching direction) to the incident light, the light reflecting member (11, 23, 24; 11', 23, 24) can reciprocatively be moved in the direction along the incident light. In this case, the length of an optical path of the incident light and reflected light can be varied.

The constant orientation, circular locus motion is a motion accompanied by a continuous rotation of the light reflecting member (11, 23, 24; 11', 23, 24). Accordingly, the constant orientation, circular locus motion is a continuous motion which does not stop at both ends of the stroke (moving range) in a direction along the incident light, and thus a high speed motion become possible. Therefore, it becomes possible to provide an apparatus which is used for increasing or decreasing the length of an optical path on a cycle and can be operated at a high speed.

(Fourth Aspect)

Apparatus of a fourth aspect of the present invention for changing the length of an optical path on a cycle is particularly characterized by having the following requirements (D01) to (D04):

(D01) a beam splitter for splitting an incident light into a reflecting light and a transmitting light, and causing both of the lights to emerge, (D02) at least one light reflecting member to reflect one of the emerged lights (transmitted light) from the beam splitter and to reenter the light in the beam splitter in the direction opposite to the emerging direction of the emerged light, the light reflecting member has one or more mirrors to reflect the incident light entering therein, in the light reflecting member, a hole used for fitting a cam and having a center line extending in the direction crossing the optical axis of the incident light is formed, (D03) an eccentric cam shaft having an eccentric cam supported so as to be rotatable around an axial line which is eccentric from the center line by a prescribed eccentric distance of r, and rotatably fitted in the hole used for fitting the cam, and (D04) means for rotating the eccentric cam shaft, the eccentric cam is fitted in the hole such that the light reflecting member performs a motion (motion subordinate to eccentric motion) including a reciprocating motion of a prescribed stroke in the direction of the incident light with the orientation of the light reflecting member being constant, when the eccentric cam shaft is continuously rotated.

(Function of the Apparatus of a Fourth Aspect)

In the apparatus of a fourth aspect of the present invention having such requirements as described above, the incident light which entered a beam splitter (B) is splitted into a reflecting light and a transmitting light, and caused to emerge therefrom. At least one light reflecting member (11, 23, 24; 11', 23, 24) reflects one of the two emerged lights from the beam splitter (B) (transmitted light) and reenter the light in the beam splitter (B) in the direction opposed to the emerging direction of the transmitted light.

Light reflecting member (11, 23, 24; 11', 23, 24) have one or more light reflecting mirrors (16*a*, 16*b*; 16*a*', 16*b*', 16*c*'), and a cam fitting hole (13*a*, 13*a*') having a center line extending in the direction crossing the light axis of the incident light is formed in the light reflecting member. Eccentric cam (8*a*, 8*b*; 8*a*') of eccentric cam shaft (8) which is rotatable around the axial line which is eccentric from the center line by an eccentric distance of r rotatably fits in the cam fitting hole (13*a*, 13*a*'). Means (apparatus) (21) for rotationally driving the cam shaft rotates the eccentric cam shaft (8).

When the eccentric cam shaft (8) rotates around the axial line which is eccentric from the center of the cam fitting hole (13, 13*a*'), the eccentric cam (8*a*, 8*b*; 8*a*') rotates (eccentrically rotates) around the axial line which is eccentric from the center of the cam fitting hole (13*a*, 13*a*') by an eccentric distance of r. The light reflecting member (11, 23, 24; 11', 23, 24) in which the cam fitting hole (13*a*; 13*a*') is formed performs a motion with the orientation of the light reflecting surface being constant (motion subordinate to eccentric rotation) including a reciprocating movement of a prescribed stroke in the direction of the incident light, in accordance with the eccentric rotation of eccentric cam (8*a*, 8*b*; 8*a'*) fitting in the cam fitting hole (13*a*; 13*a'*).

In this case, when the direction of the incident light on the light reflecting member (11, 11') is perpendicular to the line of the eccentric axial line and if the eccentric distance is r, then the stroke of the distance of reciprocating movement in the direction along the optical path of the incident light becomes 2r.

When the light reflecting member (11, 23, 24; 11', 23, 24) is reciprocatively moved by a stroke of 2r in the direction along the incident line to the light reflecting member, the length of the optical path from the point where the light emerges from a beam splitter (B) to the point where the light is reflected by the light reflecting member, and finally to the point where the light reenters in the beam splitter (B) varies on a cycle.

The motion subordinate to eccentric rotation described above is a motion accompanied with a continuous rotation of the eccentric cam shaft. Accordingly, the constant orientation, circular locus motion is a continuous motion which does not stop at both ends of the stroke of 2r in a direction along the incident light, and thus a high speed motion become possible. Therefore, it becomes possible to provide an apparatus which is used for changing the length of an optical path on a cycle and can be operated at a high speed.

(Embodiment 1 of a Fourth Aspect)

The apparatus for changing the length of an optical path on a cycle of embodiment 1 of a fourth aspect of the present invention is characterized by further having the following requirements (D05) and (D06) in the apparatus of a fourth aspect:

(D05) Apparatus is provided with a first light reflecting member (11, 23, 24; 11', 23, 24) which reflects a light and emits it as a first reflected light in a prescribed direction when the light emerged from beam splitter (B) enters, and a second light reflecting member which reflects the first reflected light and emits it as a second reflected light to the direction opposite to that of the first reflected light when the first reflected light enters therein.

(D06) Apparatus is provided with a first light reflecting member (11, 23, 24; 11', 23, 24) or a second light reflecting member in which a hole (13*a*, 13*a'*) for fitting a cam and having the center line extending in the direction crossing the optical axis of the incident light entering therein is formed.

In the embodiment 1 of a fourth aspect of the present invention, a "first light reflecting member" and "second light reflecting member" are composed of at least one light reflecting mirror (16*a*, 16*b*; 16*a'*, 16*b'*, 16*c'*). Accordingly, when an incident light enters, they reflect the light by at least one light reflecting mirror (16*a*, 16*b*; 16*a'*, 16*b'*, 16*c'*) and emit it as a first reflected light or second reflected light.

The "first light reflecting member" and "second light reflecting member" may be formed into one member by integrally connecting them, or formed into separate members.

In the present specification, the phrase "reflect one of the emerging lights and reenters it in the beam splitter (B) in the direction opposite to the emerging direction of the emerging light" includes the following meaning:

(1) To reflect one of the emerged lights and reenter it in the beam splitter (B) in an optical path parallel to the emerging light in the direction opposite to the emerging light.

(2) To reflect one of the emerged lights and reenter it in the beam splitter (B) in the same optical path as the emerging light in the direction opposite to the emerging light.

In the case (1) described above, the position where one of the reflecting light and transmitting light emerging from a beam splitter (B) reenters in the beam splitter (B) does not coincide with the position where the light emerges from the beam splitter (B). Accordingly, when the apparatus of a second aspect of the present invention for changing the length of an optical path on a cycle is used as moving mirror in Michelson interferometer, such a fixed mirror as one by which the position where other light which emerges from a beam splitter (B) is reflected by the fixed mirror of a Michelson interferometer and then reenters the beam splitter (B) coincides with the position where one of the emerged lights reenters.

(Function of Embodiment 1 of a Fourth Aspect)

In the apparatus for changing an optical path on a cycle of embodiment 1 of a fourth aspect of the present invention having such a structure as described above, the incident light entered in a beam splitter (B) is splitted into a reflecting light and a transmitting light, and caused to emerge from the beam splitter The apparatus is provided with a first light reflecting member (11, 23, 24; 11', 23, 24) and a second light reflecting member. When the light emerged from the beam splitter (B) enters a first light reflecting member (11, 23, 24; 11', 23, 24), the first light reflecting member reflects the incident light and emits it as a first reflected light to a prescribed direction. When the first reflected light enters a second light reflecting member, the second light reflecting member reflects the first reflected light and emits it as a second reflected light facing to the direction opposite to the optical path of the first reflected light.

In this case, the first light reflecting member and the second light reflecting member (11, 23, 24; 11', 23, 24) reflect one of the two emerged lights emerged from the beam splitter (B) and reenter the light in the beam splitter (B) in the direction opposite to the emerging direction of the emerged light.

In the first light reflecting member (11, 23, 24; 11', 23, 24) or the second light reflecting member, a hole (13*a*, 13*a'*) for fitting a cam and having a center line extending in the direction crossing the optical axis of the incident light entering therein is formed. Eccentric cam shaft (8) having an eccentric circular cam which is rotatably fitted in the cam fitting hole (13*a*, 13*a'*) rotates around the axial line which is eccentric from the center line by a prescribed eccentric distance of r.

The eccentric cam shaft (8) is rotated with means (apparatus) (21) for rotating a cam shaft. When the eccentric cam shaft (8) rotates around the axial line which is eccentric from the center of the cam fitting hole (13*a*, 13*a'*), the eccentric cam (8*a*, 8*b*; 8*a'*) is rotated (eccentric rotation) around the axial line which is eccentric from the center of the cam fitting hole (13*a*, 13*a'*). Corresponding to the eccentric rotation of an eccentric cam (8*a*, 8*b*; 8*a'*) fitting in the cam fitting hole (13*a*, 13*a'*), the first light reflecting member (11, 23, 24: 11', 23, 24) or the second light reflecting member in which the cam fitting hole (13*a*, 13*a'*) is formed performs a motion (motion subordinate to eccentric rotation) along the circumference with the eccentric distance (distance between the center line and the axial line) being its radius, around the eccentric axial line described above. At this time, orientation of the first light reflecting member (11, 23, 24; 11', 23, 24) or the second light reflecting member is not altered.

When the eccentric distance is assumed to be r, the stroke of moving distance of the first light reflecting member (11, 23, 24; 11', 23, 24) or the second light reflecting member in the direction of the incident light becomes 2r.

When the first light reflecting member (11, 23, 24; 11', 23, 24) and the second light reflecting member are integrally connected and moved by a stroke of 2r along the direction of the incident light entering to the first light reflecting member, the length of the optical path from the point where the light emerges from the beam splitter (B) to the point where the light is reflected by the first light reflecting member and the second light reflecting member, and finally to the point where the reflected light reenters the beam splitter (B) varies on a cycle at a stroke of 4r.

Further, when (i) the first light reflecting member (11, 23, 24; 11', 23, 24) by which a first reflected light comes to face a direction parallel and opposite to that of the incident light is used, and (ii) any one of the first light reflecting member and the second light reflecting member is fixed, and the other is moved at a stroke of 2r along the incident light, the length of the optical path from the point where the light emerges from the beam splitter to the point where the light is reflected, and finally to the point where the light reenters in the beam splitter varies on a cycle at a stroke of 8r (in the case where the second light reflecting member is fixed) or 4r (in the case where the first light reflecting member is fixed).

Movement of the first light reflecting member and the second light reflecting member (11, 23, 24; 11', 23, 24) by a stroke of 2r is caused by the motion subordinate to the eccentric rotation described above. Since the motion subordinate to the eccentric rotation is a continuous motion which does not stop at both ends of the stroke of 2r, high speed motion becomes possible. Accordingly, an apparatus which is used for changing the length of an optical path on a cycle and can be operated at a high speed can be provided.

(Embodiment 2 of a Fourth Aspect)

The apparatus for changing the length of an optical path on a cycle of embodiment 2 of a fourth aspect of the present invention is characterized by further having the following requirements (D07) and (D08) in the apparatus of a fourth aspect or embodiment 1 of a fourth aspect:

(D07) Apparatus is constructed such that an optical beam is reentered in a beam splitter (B) through the same optical path as that for one of the emerged lights in the direction opposite to that of the emerging light.

(D08) Apparatus is provided with a second light reflecting member for reflecting a first reflected light and emits it as a second reflected light of the same optical path in the direction opposite to that of the first reflected light.

(Function of Embodiment 2 of a Fourth Aspect)

In the apparatus for changing an optical path on a cycle of embodiment 2 of a fourth aspect of the present invention, a second light reflecting member of the apparatus reflects a first reflected light and emits it as a second reflected light in the same optical path in the direction opposed to the first reflected light. Accordingly, the optical beam which emerged from a beam splitter (B), was reflected by a first light reflecting member (11, 23, 24; 11', 23, 24), and then enters the second light reflecting member travels in the same optical path as one through which the light traveled until it entered the second light reflecting member, in the opposite direction, and reenters the beam splitter (B).

Thus, when the apparatus of the embodiment 2 for changing the length of the optical path on a cycle is used, for example, as moving mirror of Michelson interferometers, the interferogram described above can be obtained by arranging a fixed mirror of Michelson interferometers such that the optical beam emerged from a beam splitter (B) travels in the same optical path as one through which the light entered the fixed mirror, in the opposite direction, and then reenters the beam splitter (B).

(Embodiment 3 of a Fourth Aspect)

Apparatus of embodiment 3 of a fourth aspect of the present invention for changing the length of an optical path on a cycle is characterized by further having the following requirements (D05') and (D06') in the apparatus of a fourth aspect:

(D05') Apparatus is provided with a first light reflecting member (11, 23, 24; 11', 23, 24), a second light reflecting member, and a third light reflecting member arranged such that the first light reflecting member emits a first reflected light to a prescribed direction when the light emerged from a beam splitter (B) entered therein, the second light reflecting member emits a second reflected light in a direction which is parallel to the optical path of the first reflected light and opposite thereto, when the first reflected light entered therein, the first light reflecting member also emits a third reflected light which is a reflected light of the second reflected light, and the third light reflecting member emits a fourth reflected light direction of which is opposed to the third reflected light, when the third reflected light entered therein.

(D06') Apparatus is provided with a first light reflecting member (11, 23, 24; 11', 23, 24), a second light reflecting member, or a third light reflecting member in which a cam fitting hole (13*a*, 13*a*') having a center line extending in the direction crossing the optical axis of the incident light is formed.

In embodiment 3 of a fourth aspect of the present invention, the "first light reflecting member", "second light reflecting member", and "third light reflecting member" are composed of at least one light reflecting mirror (16*a*, 16*b*; 16*a*', 16*b*', 16*c*'). Accordingly, the "first light reflecting member", "second light reflecting member", and "third light reflecting member" reflect each incident light by at least one light reflecting mirror (16*a*, 16*b*; 16*a*', 16*b*', 16*c*') when the incident light entered therein and emit the light as the "first reflected light", "second reflected light", "third reflected light", and "fourth reflected light", respectively.

It is possible to integrally connect the "first light reflecting member" with "second light reflecting member"; the "first light reflecting member" with "third light reflecting member"; or the "first light reflecting member", "second light reflecting member", and "third light reflecting member".

(Function of Embodiment 3 of a Fourth Aspect)

In the apparatus of embodiment 3 of a fourth aspect of the present invention for changing the length of an optical path on a cycle, the incident light which entered a beam splitter (B) is splitted into a reflecting light and a transmitting light, and caused to emerge from the beam splitter (B).

The apparatus is provided with a first light reflecting member (11, 23, 24; 11', 23, 24), a second light reflecting member, and a third light reflecting member. The first light reflecting member (11, 23, 14; 11', 23, 24) emits a first reflected light to a prescribed direction when the light emerged from the beam splitter (B) entered therein. The second light reflecting member emits a second reflected light to the direction which is parallel and opposite to the optical path of the first reflected light when the first reflected light entered therein. The first light reflecting member also emits a third reflected light which faces the direction opposite to the incident light on the first light reflecting member when the second reflected light entered therein. The third light reflecting member emits a fourth reflected light facing opposite to the optical path of the third reflected light when the third reflected light entered therein.

Accordingly, the first light reflecting member (11, 23, 24; 11', 23, 24) to the third light reflecting member of the apparatus reflect one of the emerged lights from the beam splitter (B) and reenter it in the beam splitter (B) in the direction opposite to that of the emerged light.

Cam fitting hole (13*a*, 13*a'*) having a center line extending in the direction crossing the optical axis of the incident light is formed in the first light reflecting member (11, 23, 24; 11', 23, 24), the second light reflecting member, or the third light reflecting member. Eccentric cam shaft (8) having an eccentric circular cam rotatably fitting in the cam fitting hole (13*a*, 13*a'*) rotates around the axial line which is eccentric from the center line of the cam fitting hole (13*a*, 13*a'*) by a prescribed eccentric distance of r.

Eccentric cam shaft (8) is rotated with means (apparatus) (21) for rotationally driving the cam shaft. When the eccentric cam shaft (8) rotates around the axial line which is eccentric from the center of the cam fitting hole (13*a*, 13*a'*), the eccentric cam (8*a*, 8*b*; 8*a'*) rotates (eccentrically rotates) around the axial line which is eccentric from the center of the cam fitting hole (13*a*, 13*a'*). The first light reflecting member (11, 23, 24; 11', 23, 24), second light reflecting member, or third light reflecting member in which a cam fitting hole (13*a*, 13*a'*) is formed performs a motion (motion subordinate to eccentric rotation) along the circumference with an eccentric distance (distance between the center line and the axial line) being its radius, around the eccentric axial line in accordance with the eccentric rotation of eccentric cam (8*a*, 8*b*; 8*a'*) fitted in the cam fitting hole (13*a*, 13*a'*). At this time, the first light reflecting member, second light reflecting member, or third light reflecting member (11, 23, 24; 11', 23, 24) in which the cam fitting hole (13*a*, 13*a'*) is formed performs a motion subordinate to eccentric rotation along the circumference with the eccentric distance being its radius, but the orientation of the first light reflecting member, second light reflecting member, or third light reflecting member (11, 23, 24; 11', 23, 24) is not altered.

In this case, when the eccentric distance is assumed to be r, the stroke of the moving distance of the first light reflecting member (11, 23, 24; 11', 23, 24), second light reflecting member, or third light reflecting member in which the cam fitting hole (13*a*, 13*a'*) is formed, in the direction of the incident line becomes 2r.

For instance, when the first light reflecting member (11, 23, 24; 11', 23, 24) from which the first reflected light is caused to emerge to the direction to that of the incident light entered therein is used, the third light reflecting member is fixed, the first light reflecting member (11, 23, 24; 11', 23, 24) and the second light reflecting member are integrally connected, and the first and second light reflecting members are moved in the direction along the incident light to the first light reflecting member at a stroke of 2r, the length of the optical path from the point where the optical beam emerges from the beam splitter (B) to the point where the optical beam is reflected by the first, second, and third light reflecting members, and finally to the point where the optical beam reenters the beam splitter (B) is varied on a cycle at a stroke of 8r.

Also, for instance, when the first light reflecting member (11, 23, 24; 11', 23, 24) from which the first reflected light is caused to emerge to the direction opposite to that of the incident light entered therein is used, the second and third light reflecting members are fixed, and the first light reflecting member is moved along the incident light at a stroke of 2r, the length of the optical path from the point where the optical beam emerges from the beam splitter (B) to the point where the optical beam is reflected by the first, second, and the third light reflecting members (11, 23, 24; 11', 23, 24), and finally to the point where the optical beam reenters the beam splitter (B) varies on a cycle at a stroke of 16r.

Movement of the first light reflecting member (11, 23, 24; 11', 23, 24) by a stroke of 2r is caused by the motion subordinate to eccentric rotation. Since the motion subordinate to eccentric rotation is a continuous motion which does not stop at both ends of the stroke of 2r, high speed motion becomes possible. Accordingly, an apparatus which is used for increasing or decreasing the length of an optical path on a cycle and operated at a high speed can be provided.

Further, it is possible to move the second or third light reflecting member at a stroke of 2r instead of moving the first light reflecting member (11, 23, 24; 11', 23, 24) at a stroke of 2r.

(Embodiment 4 of a Fourth Aspect)

Apparatus of embodiment 4 of a fourth aspect of the present invention for changing the length of the optical path on a cycle is characterized by further having the following requirements (D07) and (D08') in the apparatus of embodiment 3 of a fourth aspect of the present invention:

(D07) Apparatus is constructed such that the optical beam is reentered the beam splitter (B) through the same optical path as that of one of the emerging lights (transmitting light) in the direction opposed to that of the emerging light.

(D08') Apparatus is provided with a third light reflecting member which emits a fourth reflected light in the same optical path as that of the third reflected light in the direction opposed to the third reflecting light.

(Function of Embodiment 4 of a Fourth Aspect)

In the apparatus of embodiment 4 of a fourth aspect of the present invention for changing the length of an optical path on a cycle, the third light reflecting member of the apparatus emits a fourth reflected light in the same optical path as that of the third reflected light in the direction opposite to the third reflected light. Thus, the optical beam which emerges from the beam splitter (B), is reflected by the first and the second light reflecting members (11, 23, 24; 11', 23, 24) in turn, and enters into the third light reflecting member travels completely the same optical path as that through which the optical beam traveled until it entered the third light reflecting member, in the direction opposite to the incident light entering therein and reenters the beam splitter (B).

Accordingly, when the apparatus of embodiment 4 of a fourth aspect for changing the length of an optical path on a cycle is used, for example, as a moving mirror of Michelson interferometer, the interferogram can be obtained by arranging a fixed mirror of Michelson interferometers such that the light entered from a beam splitter (B) travels completely the same optical path as that in which the beam traveled until it entered the fixed mirror, in the direction opposite to the direction of the incident light entering therein and reenters the beam splitter.

(Embodiment 5 of a Fourth Aspect)

The apparatus of embodiment 5 of a fourth aspect of the present invention is characterized by further having the following requirement (D09) in the apparatus of any one of embodiments 1 to 4 of a fourth aspect.

(D09) Apparatus in which a first, second, or third light reflecting member (11, 23, 24; 11', 23, 24) is composed of a roof mirror having two light reflecting surfaces which are rectangular to each other or composed of a corner mirror having three light reflecting surfaces which are rectangular one another.

(Function of Embodiment 5 of a Fourth Aspect)

In the apparatus of embodiment 5 of the present invention having such a structure as described above for changing the length of an optical path, the first, second, or third light reflecting member (11, 23, 24; 11', 23, 24) is composed of a roof mirror having two light reflecting surfaces which are rectangular each other, or composed of a corner mirror having three light reflecting surfaces which are rectangular one another. Under such condition, in the light reflecting member (11, 23, 24; 11', 23, 24) composed of a roof mirror or corner mirror, direction of the incident light and that of emerging light become parallel and opposite to each other within the plane perpendicular to the two light reflecting surfaces in the case of the roof mirror, and in any plane having incident light in the case of the corner mirror. Accordingly, it becomes easy to position the light reflecting member (11, 23, 24; 11', 23, 24).

Also, it becomes possible to compensate the alteration of the orientation of the light reflecting member due to a defective mechanism for moving light reflective member.

BEST MODE FOR CARRYING OUT THE INVENTION

Now, specific examples of embodiments (that is, Examples) of the apparatus of the present invention for increasing or decreasing the length of an optical path on a cycle are described with reference to drawings. However, it should be understood that the present invention is by no means restricted by such specific Examples.

EXAMPLE 1

Figure 2:
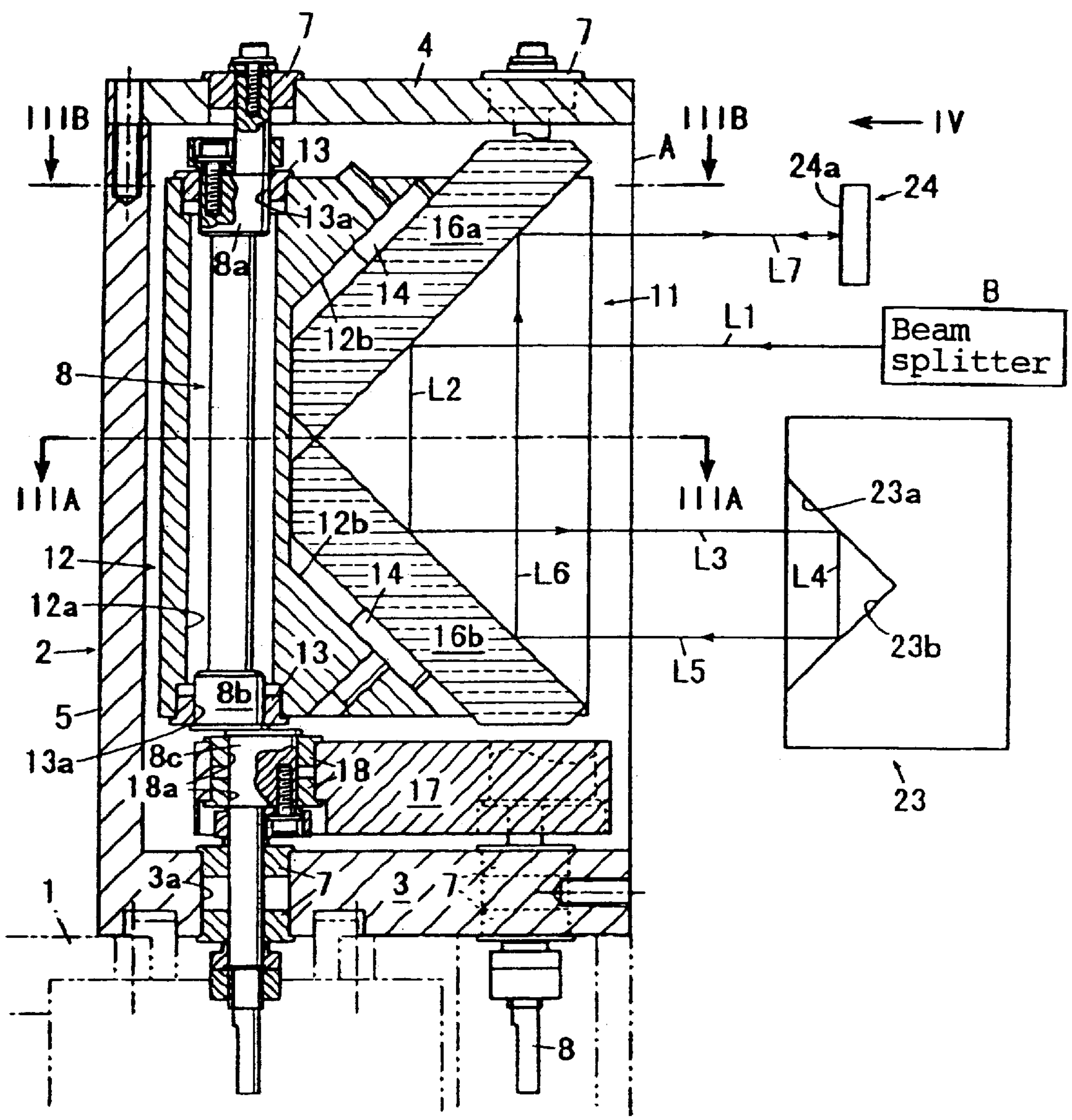
FIG. 2 is an illustration of a first to third light reflecting members in the apparatus in Example 1.
Figure 3A:
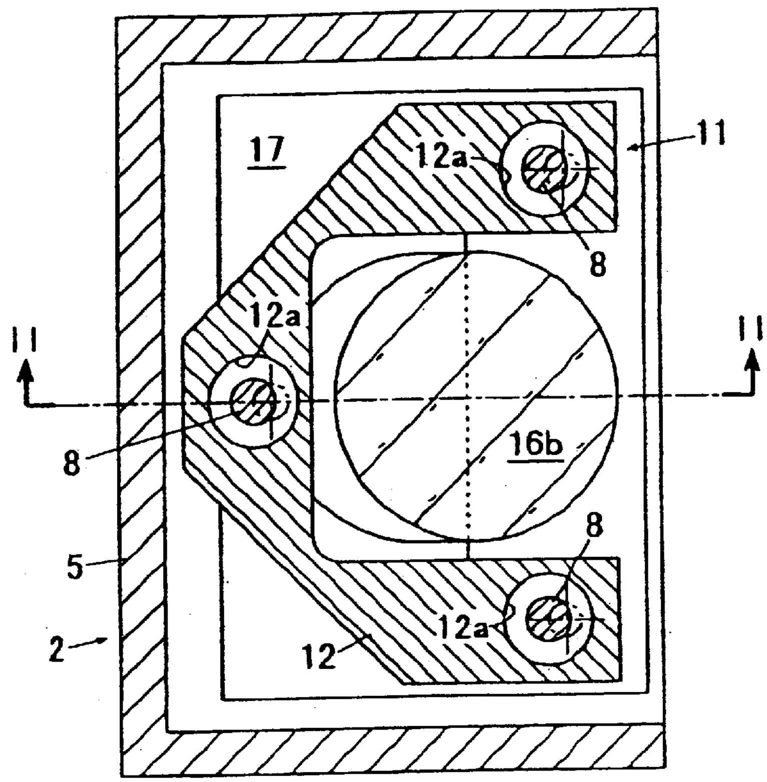
FIGS. 3A to 3D are illustrations of the relation between a light reflecting member and an eccentric cam shaft.
Figure 3B:
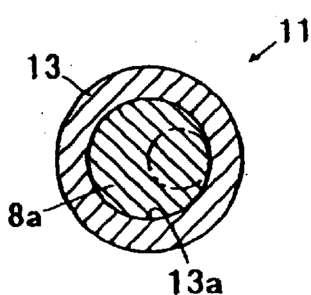
Figure 3C:
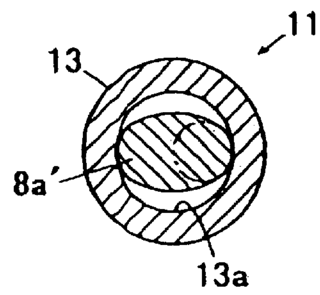
Figure 3D:
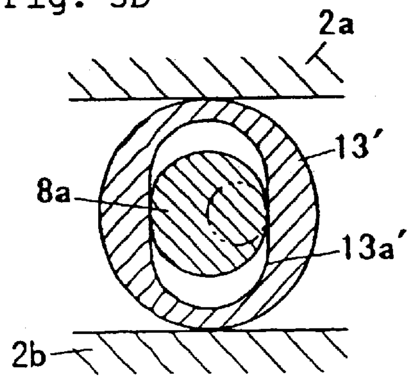
Figure 4:
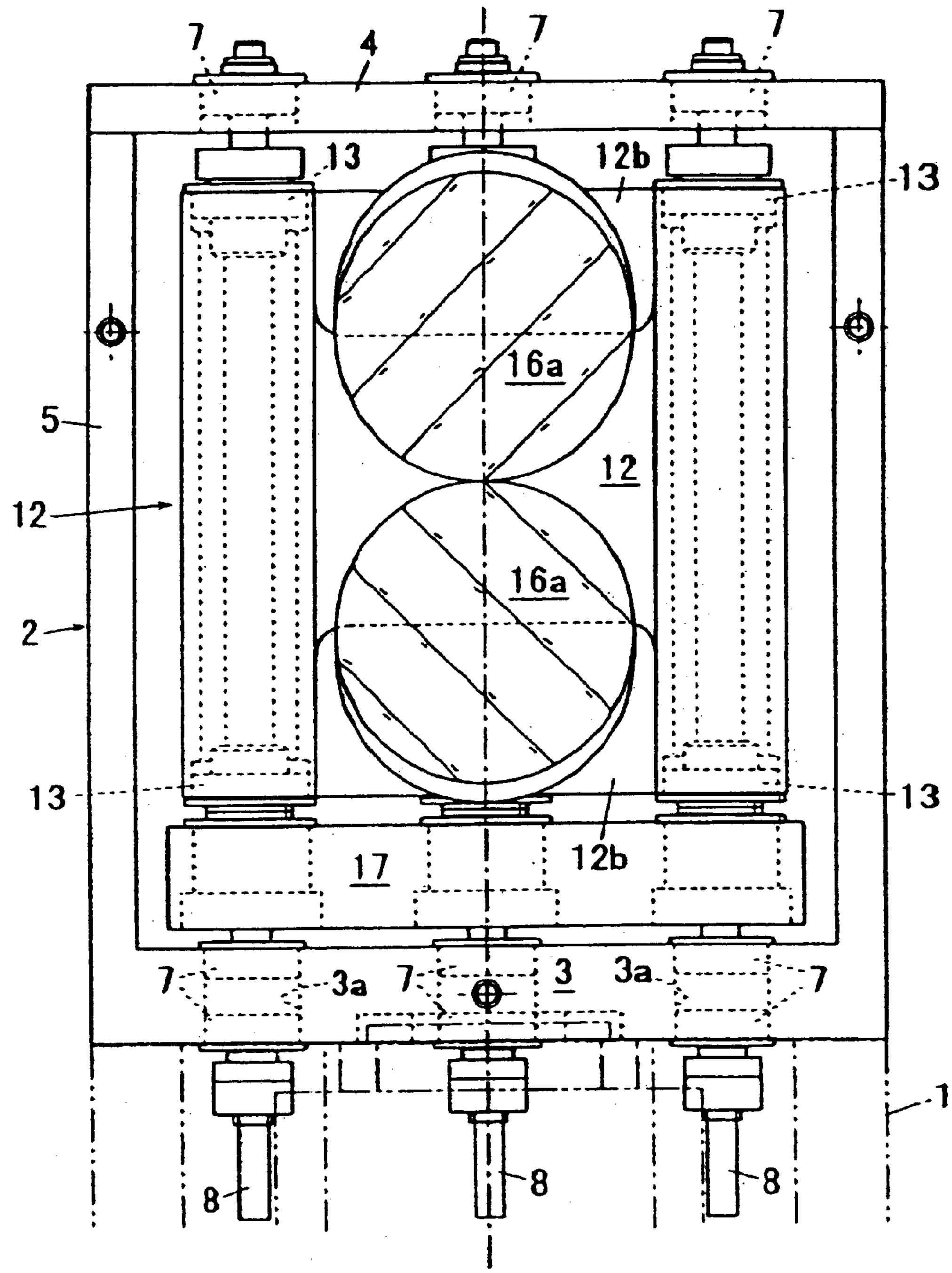
FIG. 4 is a cross-sectional view of the apparatus viewed from the direction of the arrow IV in FIG. 2.
Figure 5:
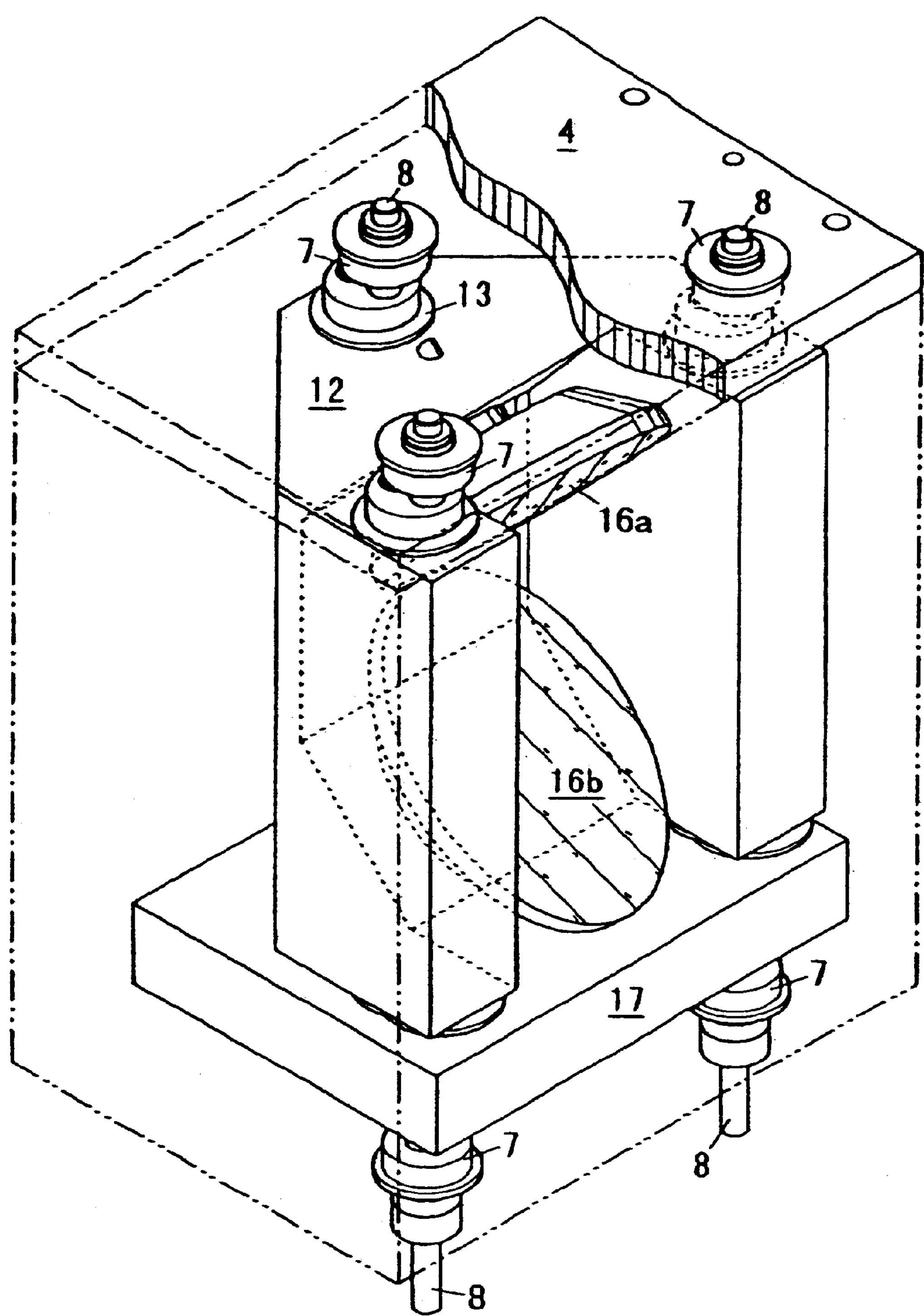
FIG. 5 is an oblique view of the apparatus shown in FIG. 4.

FIG. 1 is an illustration of a first light reflecting member in the apparatus of the present invention in this Example for changing the length of an optical path on a cycle and an illustration of a mechanism for driving the first light reflecting member. FIG. 2 is an illustration of first to third light reflecting members in the apparatus in this Example for changing the length of an optical path on a cycle. FIGS. 3A to 3D are illustrations of the relation between a light reflecting member and an eccentric cam shaft. FIG. 3A is a cross-sectional view taken along the line IIIA—IIIA of FIG. 2. FIG. 3B is an illustration of the relation between cam fitting hole 13*a* of a light reflecting member and eccentric cam 8*a* of an eccentric cam shaft viewed along the line IIIB—IIIB in FIG. 2. FIG. 3C is a drawing showing a modification of the cam fitting hole and eccentric cam shown in FIG. 3B. FIG. 3D is a drawing showing another modification of the cam fitting hole and eccentric cam shown in FIG. 3B. FIG. 4 is a drawing of a light reflecting member viewed along the direction of arrow IV in FIG. 2. FIG. 5 is an oblique view of the apparatus shown in FIG. 4.

Figure 6B:
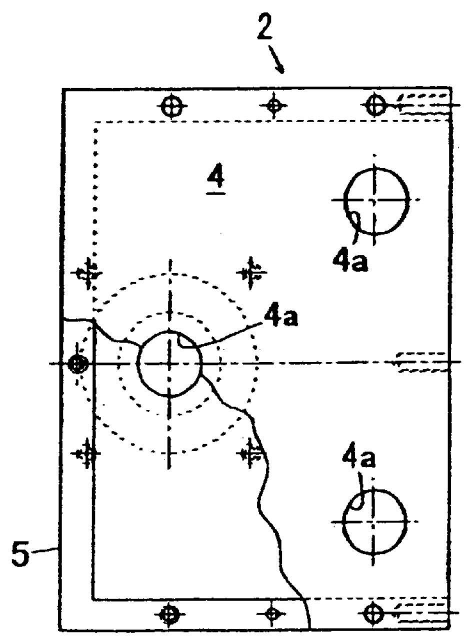
FIGS. 6A to 6C show illustrations of a supporting frame for the apparatus shown in FIG. 1.
Figure 6A:
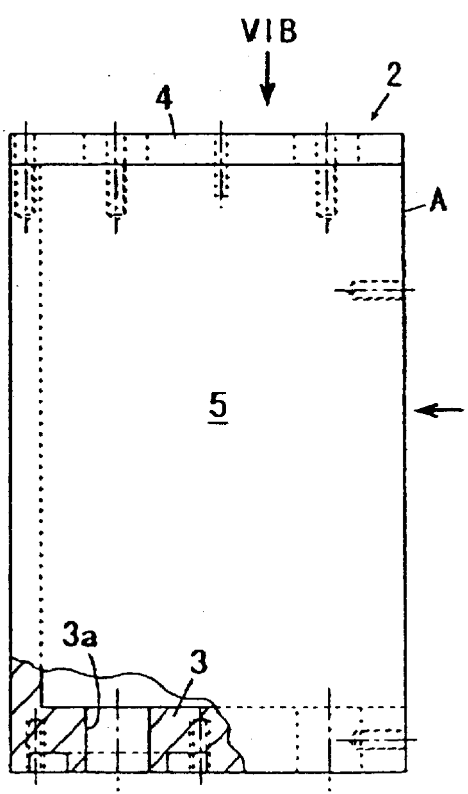
Figure 6C:
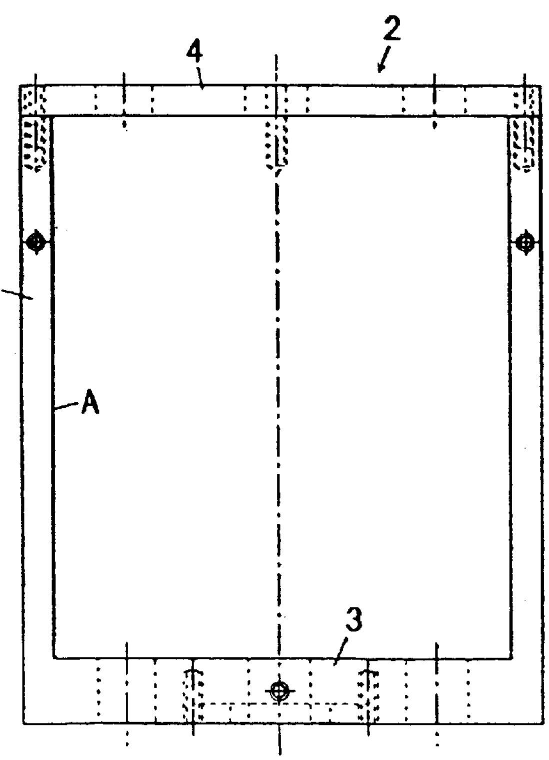
Figure 7B:
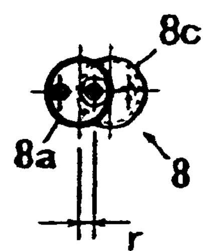
FIGS. 7A to 7C show illustrations of the eccentric cam shaft shown in FIG. 1.
Figure 7A:
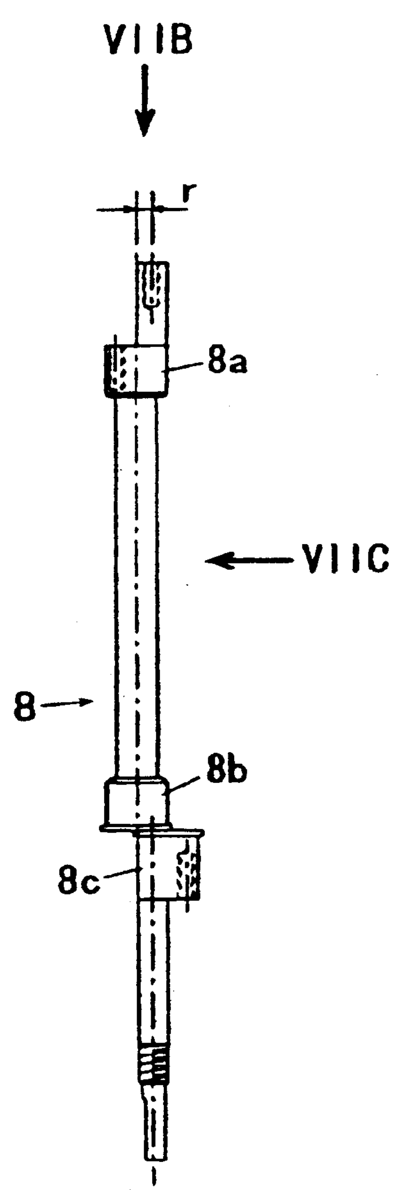
Figure 7C:
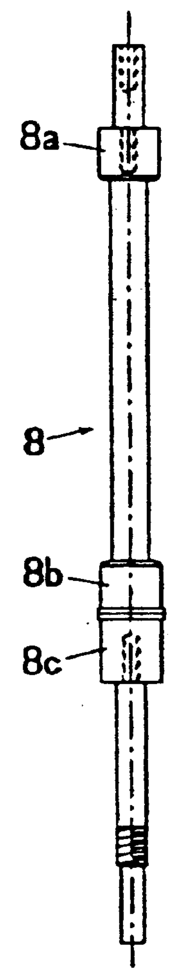
Figure 8B:
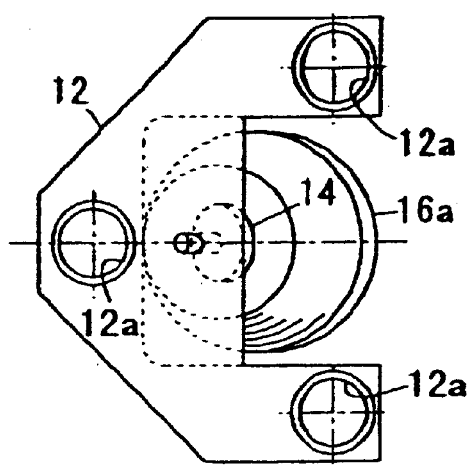
FIGS. 8A to 8C show illustrations of a first light reflecting member shown in FIG. 1.
Figure 8A:
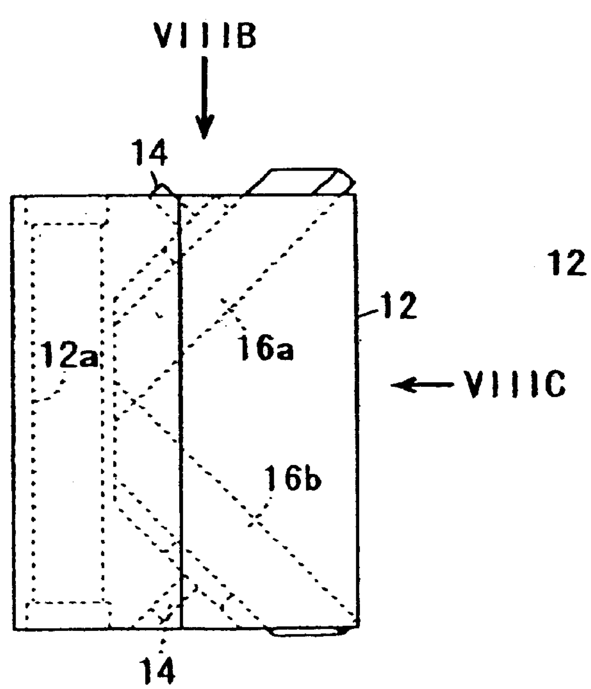
Figure 8C:
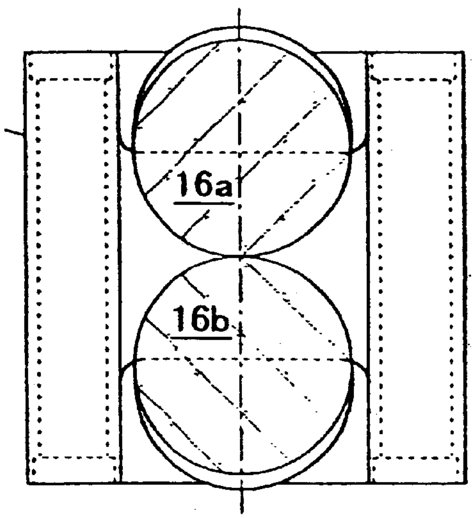
Figure 9B:
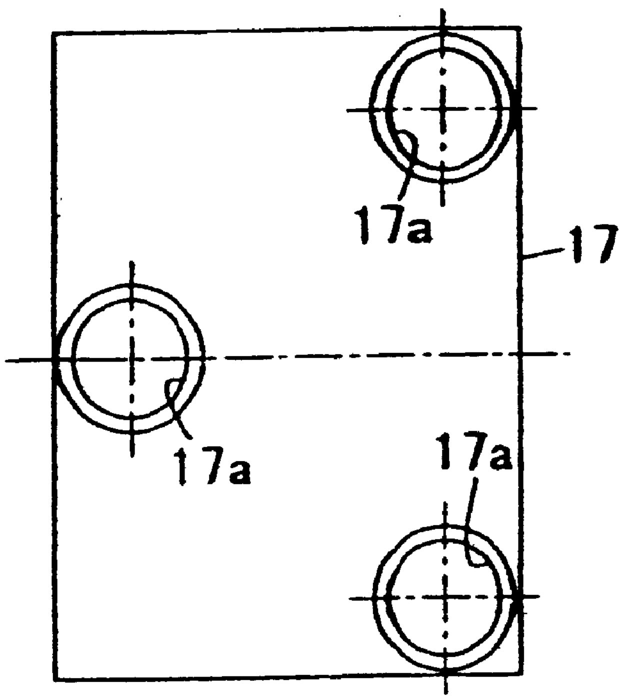
FIGS. 9A and 9B show illustrations of the balancer shown in FIG. 1.
Figure 9A:
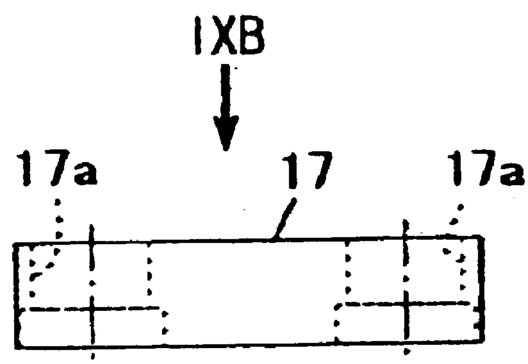

FIGS. 6A to 6C show illustrations of a supporting frame for the apparatus shown in FIG. 1. FIG. 6A is a side view of the frame shown in FIG. 1 viewed from the same direction as FIG. 1. FIG. 6B is the plane view of the frame viewed from the direction of arrow VIB in FIG. 6A. FIG. 6C is another side view of the frame viewed from the direction of arrow VIC in FIG. 6A. FIGS. 7A to 7C show illustrations of an eccentric cam shaft shown in FIG. 1. FIG. 7A is an illustration of the eccentric cam shaft viewed from the same direction as FIG. 1. FIG. 7B is another illustration of the eccentric cam shaft viewed from the direction of arrow VIIB in FIG. 7A. FIG. 7C is still another illustration of the eccentric cam shaft viewed from the direction of arrow VIIC in FIG. 7A. FIGS. 8A to 8C show illustrations of a first light reflecting members shown in FIG. 1. FIG. 8A is a side view of the light reflecting member shown in FIG. 1 viewed from the same direction as FIG. 1. FIG. 8B is the plane view of the light reflecting member viewed from the direction of arrow VIIIB in FIG. 8A. FIG. 8C is another side view of the light reflecting member viewed from the direction of arrow VIIIC in FIG. 8A. FIGS. 9A and 9B show illustrations of a balancer shown in FIG. 1. FIG. 9A is a side view of the balancer viewed from the same direction as FIG. 1. FIG. 9B is the plane view of the balancer viewed from the direction of arrow IXB in FIG. 9A.

In FIG. 1 and FIG. 6A, supporting frame 2 is fixed on upper surface of base 1. Supporting frame 2 has lower wall 3, upper wall 4, and side wall 5 connecting both walls 3 and 4, and opening A for entering an optical beam is formed at the right hand side in FIG. 1.

In the lower wall 3 and upper wall 4, three shaft supporting holes (3*a*) and (4*a*) are formed, respectively. In each of the three shaft supporting holes 3*a* and 4*a*, bearing 7 is rotatably supported, respectively. Three eccentric cam shafts 8 are rotatably supported by the bering 7.

The eccentric cam shaft 8 (reference is made to FIGS. 7 and 2) extends upward and downward, and has three circular eccentric cams 8*a*, 8*b*, and 8*c* having the same diameter, at an intermediate portion between the upward and downward directions. Eccentric direction of circular eccentric cams 8*a* and 8*b* are deviated from that of circular eccentric cam 8*c* by 180°.

First light reflecting member 11 supported by the eccentric cam shaft 8 has mirror holder 12. In FIGS. 2 and 3, mirror holder 12 has a shaft through hole 12*a* through which the eccentric cam shaft 8 penetrates. At both upper and lower ends of the shaft through hole 12*a*, bearing 23 is fitted, respectively. In bearing 13, a circular cam fitting hole 13*a* is formed. In each of the circular cam fitting hole 13*a* (see FIG. 2 and 3B) of the bearing 13, 13, the circular eccentric cam 8*a* and 8*b* are rotatably fitted at the both upper and lower ends of the holes.

In this connection, it is possible to use an elliptic eccentric cam 8*a*' shown in FIG. 3C in place of circular eccentric cams 8*a* and 8*b* shown in FIG. 2 and FIG. 3B. Further, bearing 13' having an elliptic cam fitting hole 13*a*' shown in FIG. 3D can be used in place of bearing 13 having a circular cam fitting hole 13*a* in which circular eccentric cams 8*a* and 8*b* shown in FIGS. 2 and 3 are fitted, respectively. In this case, it is sufficient that the bearing 13' is protruded above the upper surface or below the lower surface of mirror holder 12, and guides 2*a* and 2*b*, which guide the protruded portion to the direction of the incident light from the beam splitter B, are provided in the supporting frame 2. In this case, it becomes possible to make the first light reflecting material 11 perform a linear reciprocal movement in the direction of the incident light.

In the mirror holder 12, a pair of mirror attaching surfaces 12*b* and 12*b* having an angle to the upper or lower direction of 45° are formed such that they form a right angle. On the mirror attaching surfaces 12*b* and 12*b*, mirror supporting members 14 and 14 are attached, and upper light reflecting mirror 16*a* and lower light reflecting mirror 16*b* are fixed by the mirror holding members 14 and 14.

The first light reflecting member 11 is composed of elements shown by the symbols 12 to 16 described above.

In balancer 17 which is connected to the circular eccentric cam 8*c* (cam which is eccentric to the side opposite to the circular eccentric cam 8*a* and 8*b*) of the eccentric cam shaft 8, shaft through hole 17*a* through which the eccentric cam shaft 8 penetrates is formed. At the upper and lower end portions of the shaft through hold 17*a,* bearing 18 is attached, respectively. In the bearing 18, circular hole 18*a* is formed. In each circular hole 18*a* of the bearing 18 and 18 at the upper and lower end portions (see FIG. 2), the circular eccentric cam 8*c* is rotatably fitted.

It is also possible that the bearing 18 of the balancer 17 is formed in such a construction as shown in FIG. 3B, FIG. 3C, and FIG. 3D.

In FIG. 1, motor unit (apparatus for rotating a cam shaft) is attached to the lower end of the base 1, and shaft 21*a* for producing a turning effect of motor unit 21 is connected by coupler 22 to the lower end of one eccentric cam shaft 8 among the three eccentric cam shafts 8, 8, and 8. Accordingly, the eccentric cam shaft 8 rotates by the rotation of the turning effect producing shaft 21*a*, and at this time, circular eccentric cam shafts 8*a*, 8*b*, and 8*c* also eccentrically rotate (perform rotation around the axial line which is eccentric from the center of the circle of circular eccentric cam). The first light reflecting member 11 having circular cam fitting holes 13*a* and 18*a* in which the circular eccentric cams 8*a*, 8*b*, and 8*c* fit performs a motion (motion subordinate to eccentric rotation) along the circumference having a radius of r which is an eccentric distance (distance between the center of the circular eccentric cam and the eccentric axial line) (see FIGS. 7A and 7B) around each axial line. At this time, the orientation of the first light reflecting member 11 does not alter.

The motion subordinate to eccentric rotation of first light reflecting member 11 when the cam in FIG. 3B and FIG. 3C are used belongs to constant orientation, circular locus motion in which a light reflecting member moves on a circular locus at the condition of a constant orientation.

Accordingly, the elements indicated by symbols 7, 8, 13, and the likes in Example 1 constitute means (7, 8, and 13) for converting a turning effect into a constant orientation, circular locus motion which makes the first light reflecting member 11 perform a constant orientation, circular locus motion by the turning effect of motor unit (rotational driving apparatus) 21.

In FIG. 2, second light reflecting member 23 and third light reflecting member 24 are fixed in such an arrangement that the light reflecting members face to the opening A for entering the optical beam of the first light reflecting member 11. Second light reflecting member 23 has a roof mirror having upper light reflecting surface 23*a* and lower light reflecting surface 23*b*, and a light reflecting mirror supporting member (not shown in drawings) for supporting the roof mirror. Also, the third light reflecting member has a light reflecting mirror having light reflecting surface 24 and a light reflecting mirror supporting member (not shown in drawings) for supporting the light reflecting member.

In FIG. 2, the first light reflecting member 11, second light reflecting member 23, and third light reflecting member 24 are arranged such that when the incident light which entered the first light reflecting member from beam splitter B (see FIG. 2) through optical path L1 enters light reflecting surface 24*a* of the third light reflecting member through optical paths L2, L3, L4, L5, L6, and L7 in turn, the light reflecting surface 24*a* of the third light reflecting member reflects the incident light to the direction opposite to that of the incident light (direction of the optical path L7).

(Function of Apparatus in Example 1)

In the apparatus of Example 1 having such a structure as described above, one of the emerged two lights which were splitted by beam splitter B of a Michelson interferometer (not shown in drawing) into a transmitting light and reflecting light and emerges from the beam splitter B enters upper light reflecting mirror 16*a* of first light reflecting member 11 through optical path L1 as shown in FIG. 2. Reflected light reflected by the light reflecting mirror 16*a* enters third light reflecting member 24 through optical paths L2, L3, L4, L5, L6, and L7, is reflected by the third light reflecting member, and then reenters the beam splitter B through optical paths L7, L6, L5, L4, L3, L2, and L1.

When the motor unit 21 rotates, the first light reflecting member 11 reciprocates to right and left at a stroke of 2r, double the eccentric distance (distance between the center of the circular eccentric cams 8*a* and 8*b*, and the axial line) of r (see FIGS. 7A and 7B). At this time, the first light reflecting member 11 performs a motion (motion subordinate to eccentric rotation) along the circumference with the eccentric distance r being its radius, around each eccentric axial line. The orientation of the first light reflecting member is constant and is not altered this time.

Also at this time, the length of reciprocating optical path from the point where an optical beam emerges from a beam splitter to the point where the beam reenters the beam splitter after reflected by the first, second, and third light reflecting members is varied on a cycle at a stroke of 16r.

Different from a simple linear reciprocation, movement of the first light reflecting member 11 at a stroke of 2r is caused by the motion subordinate to eccentric rotation. Since the motion subordinate to eccentric rotation is a continuous motion in which the motion does not stop at both ends of the stroke 2, high speed motion becomes possible. Accordingly, an apparatus which is used for increasing or decreasing the length of the optical path on a cycle and can be operated at a high speed can be provided.

Balancer 17 having circular cam fitting hole 18*a* in which the circular eccentric cam 8*c* fits moves to the position which is symmetrical to the eccentric axial line (rotation axis of eccentric cam shaft 8) with respect to the axis of the first light reflecting member 11 when the eccentric cam shaft rotates. Accordingly, mass balance around the rotation axis (eccentric axis) of a rotating member which rotates together the eccentric cam shaft 8 is improved and thus the fluctuation of rotational speed of eccentric cam shaft 8 can be decreased. Accordingly, the motion subordinate to eccentric rotation of the first light reflecting member becomes a stabilized rotation of a small speed fluctuation, and thus the first light reflecting member 11 can perform a stabilized motion of a small speed fluctuation at a high speed along the direction of the incident light which emerged from a beam splitter and enters the first light reflecting member.

EXAMPLE 2

Figure 10A:
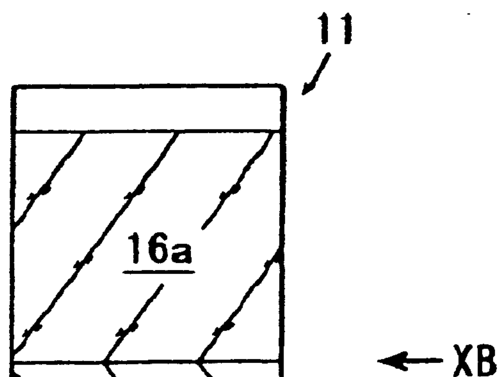
FIGS. 10A to 10C show illustrations of a principal part of the apparatus of the present invention in Example 2 for changing the length of an optical path on a cycle.
Figure 10B:
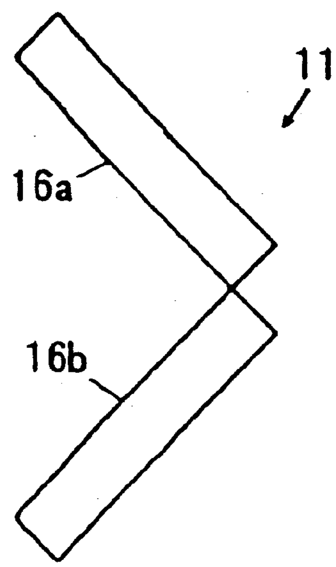
Figure 10C:
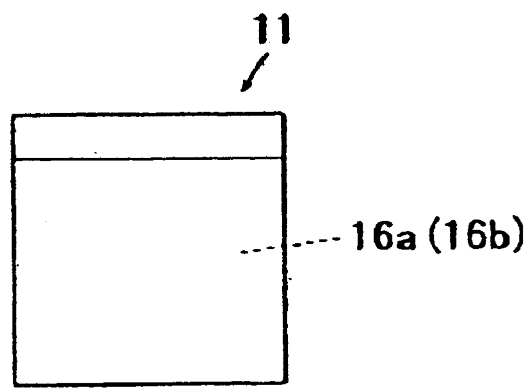
Figure 11A:
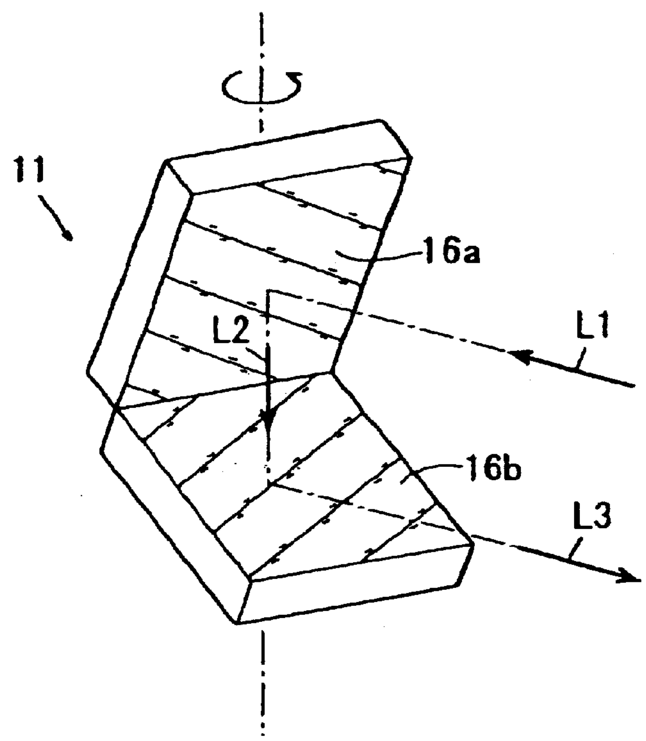
FIGS. 11A and 11B show illustrations of a motion subordinate to an eccentric rotation of light reflecting mirrors when a first light reflecting member in FIGS. 10A to 10C are rotated around an eccentric axis.
Figure 11B:
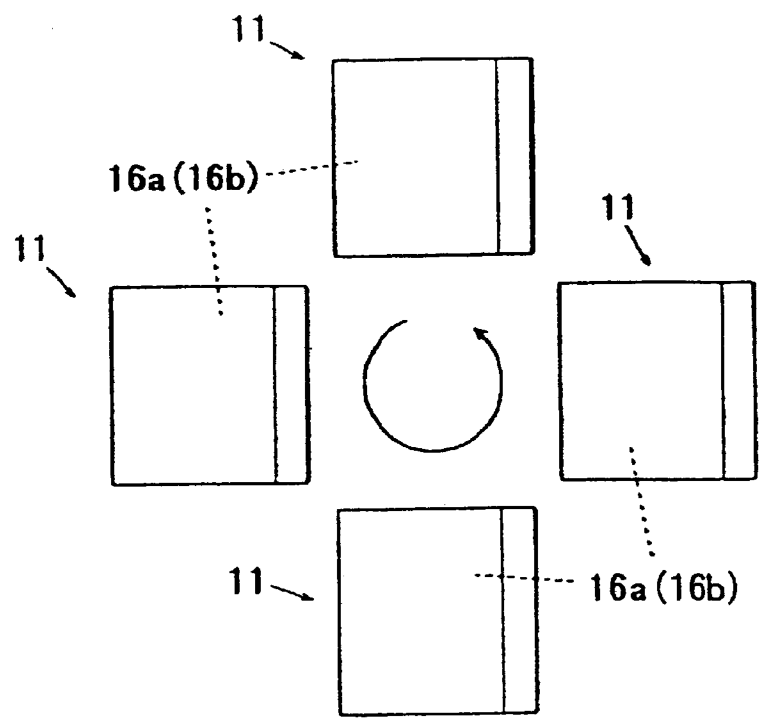

FIGS. 10A to 10C are illustrations of a principal part of the apparatus of the present invention in this Example for changing the length of an optical path on a cycle. FIG. 10A shows the front view of a light reflecting mirror of a first light reflecting member (view of the first light reflecting member viewed from the direction in which the light emerged from a beam splitter enters the first light reflecting member). FIG. 10B is a view of the mirror viewed from the direction of arrow XB in FIG. 10A. FIG. 10C is a view of the mirror viewed from the direction of arrow XC in FIG. 10A. FIGS. 11A and 11B show illustrations of a motion subordinate to an eccentric rotation of light reflecting mirrors when the first light reflecting member is rotated around the eccentric axis. FIG. 11A illustrates the positional relation between a light reflecting mirror and the eccentric axis. FIG. 11B is an illustration of a motion subordinate to an eccentric rotation of light reflecting mirrors of the first light reflecting member.

Apparatus of this Example is different from that of Example 1 in the following points, but the apparatus is constructed in the same manner as in Example 1 in other points.

In FIGS. 10A to 10C, the apparatus of the present invention in this Example for changing the length of an optical path on a cycle is different from that of Example 1 in the point that the light reflecting surface of the upper light reflecting mirror 16*a* and lower light reflecting mirror 16*b* are formed in a square in stead of a circle in Example 1.

Other constructions are the same as in Example 1.

As shown in FIGS. 11A and 11B, first light reflecting member 11 in this Example performs a motion subsequent to eccentric rotation (movement around the eccentric axis) in the same manner as in Example 1. Whereas four positions around an eccentric axis when the first light reflecting member 11 performs a motion subordinate to eccentric rotation (movement around the eccentric axis) are shown apart from one another in FIG. 11B, the first light reflecting member at the four positions described above are close and overlap one another in actuality.

Since the motion subordinate to eccentric rotation of the first light reflecting member 11 becomes a stable rotational motion of a small speed fluctuation even in this Example, in the same manner as in Example 1, the first light reflecting member 11 can perform a stabilized reciprocation of a small speed fluctuation at a high speed along the direction in which the incident light which emerged from a beam splitter and enters the first light reflecting member.

EXAMPLE 3

Figure 12A:
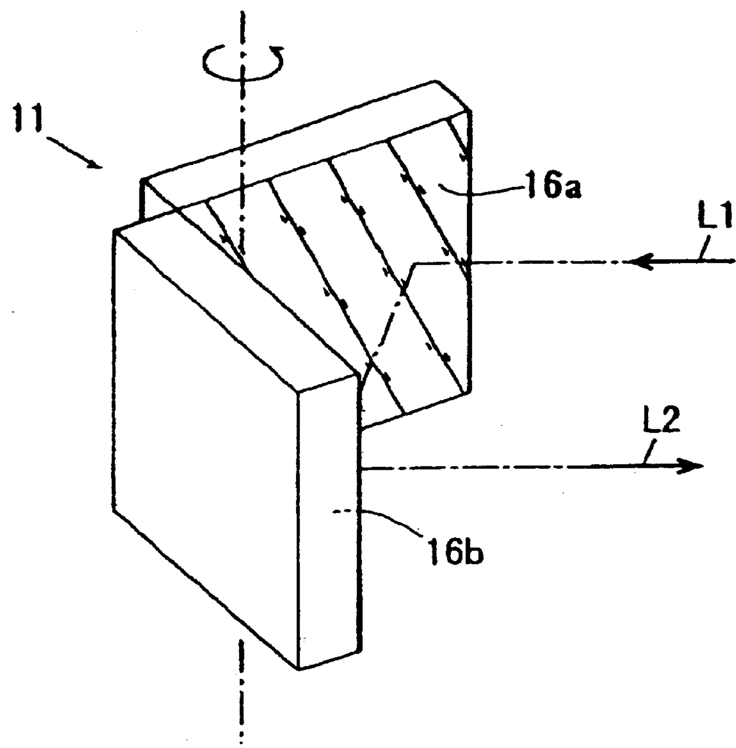
FIGS. 12A and 12B show illustrations of a motion subordinate to an eccentric rotation of light reflecting mirrors when a first light reflecting member which is a principal part of the apparatus of the present invention in Example 3 for changing the length of an optical path on a cycle is rotated around an eccentric axis.
Figure 12B:
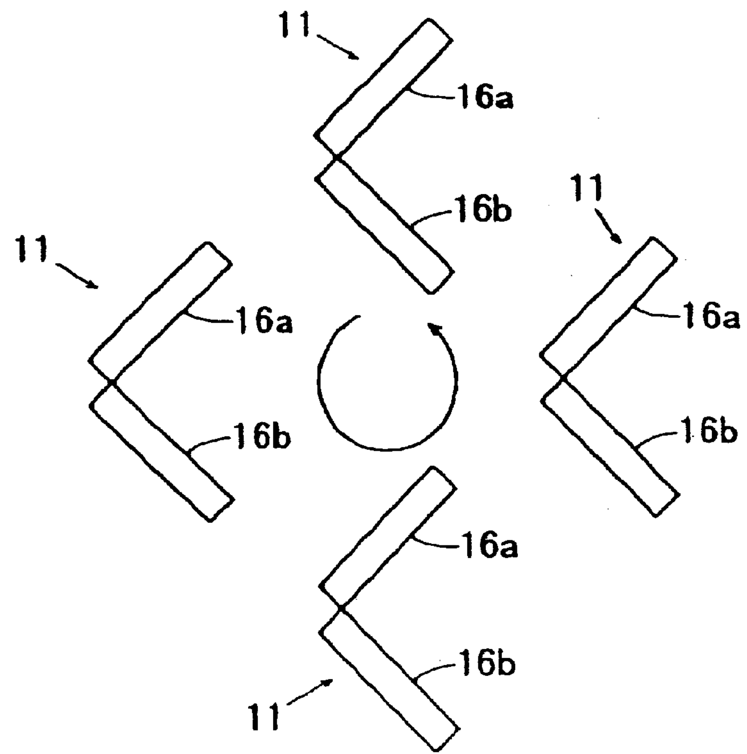

FIGS. 12A and 12B show illustrations of a motion subordinate to an eccentric rotation of light reflecting mirrors when a first light reflecting member which is a principal part of the apparatus of the present invention in this Example for changing the length of an optical path on a cycle is rotated around an eccentric axis. FIG. 12 A is a drawing showing the positional relation of a light reflecting mirror and an eccentric axis. FIG. 12B is an illustration of a motion subordinate to an eccentric rotation of light reflecting mirrors of the first light reflecting member.

Whereas the apparatus of this Example is different from that of Example 2 in the following points, the apparatus is constructed in the same manner as in Example 2 shown in FIGS. 10A to 10C, and FIGS. 11A to 11B in other points.

In FIGS. 12A and 12B, first light reflecting member 11 of the apparatus of the present invention in this Example for changing the length of an optical path on a cycle is composed of right side light reflecting mirror 16*a* and left side light reflecting mirror 16*b* disposed left and right, respectively. As shown in FIGS. 12A and 12B. The first light reflecting member 11 in this Example performs a motion subsequent to eccentric rotation (movement around the eccentric axis) in the same manner as in Example 1. When the first light reflecting member 11 performs a motion subordinate to eccentric rotation (movement around the eccentric axis), four positions around an eccentric axis are shown apart from one another in FIG. 12B. However, the first light reflecting member at the four positions described above are close and overlap one another in actuality.

Since the motion subordinate to eccentric rotation of the first light reflecting member 11 becomes a stable rotational motion of a small speed fluctuation even in this Example, in the same manner as in Example 1, the first light reflecting member 11 can perform a stabilized reciprocation of a small speed fluctuation at a high speed along the direction in which the incident light which emerged from a beam splitter enters the first light reflecting member.

EXAMPLE 4

Figure 13A:
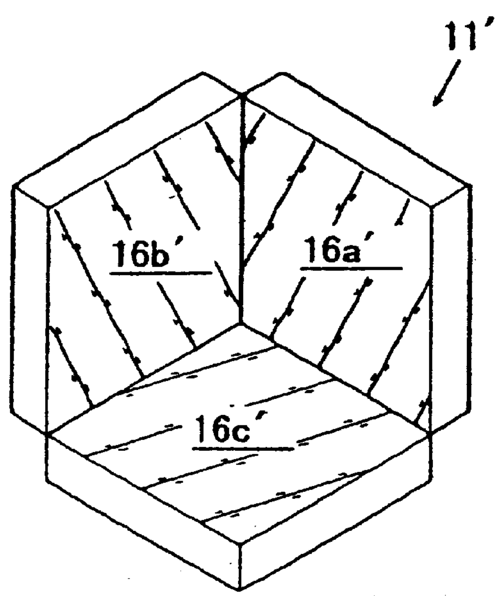
FIGS. 13A to 13C show illustrations of a principal part of the apparatus of the present invention in Example 4 for changing the length of an optical path on a cycle.
Figure 13B:
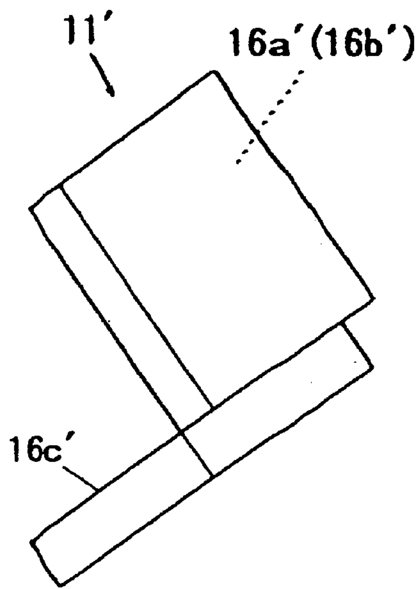
Figure 13C:
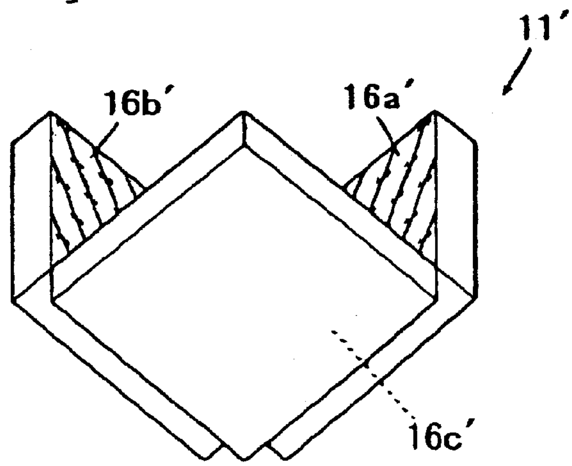
Figure 14:
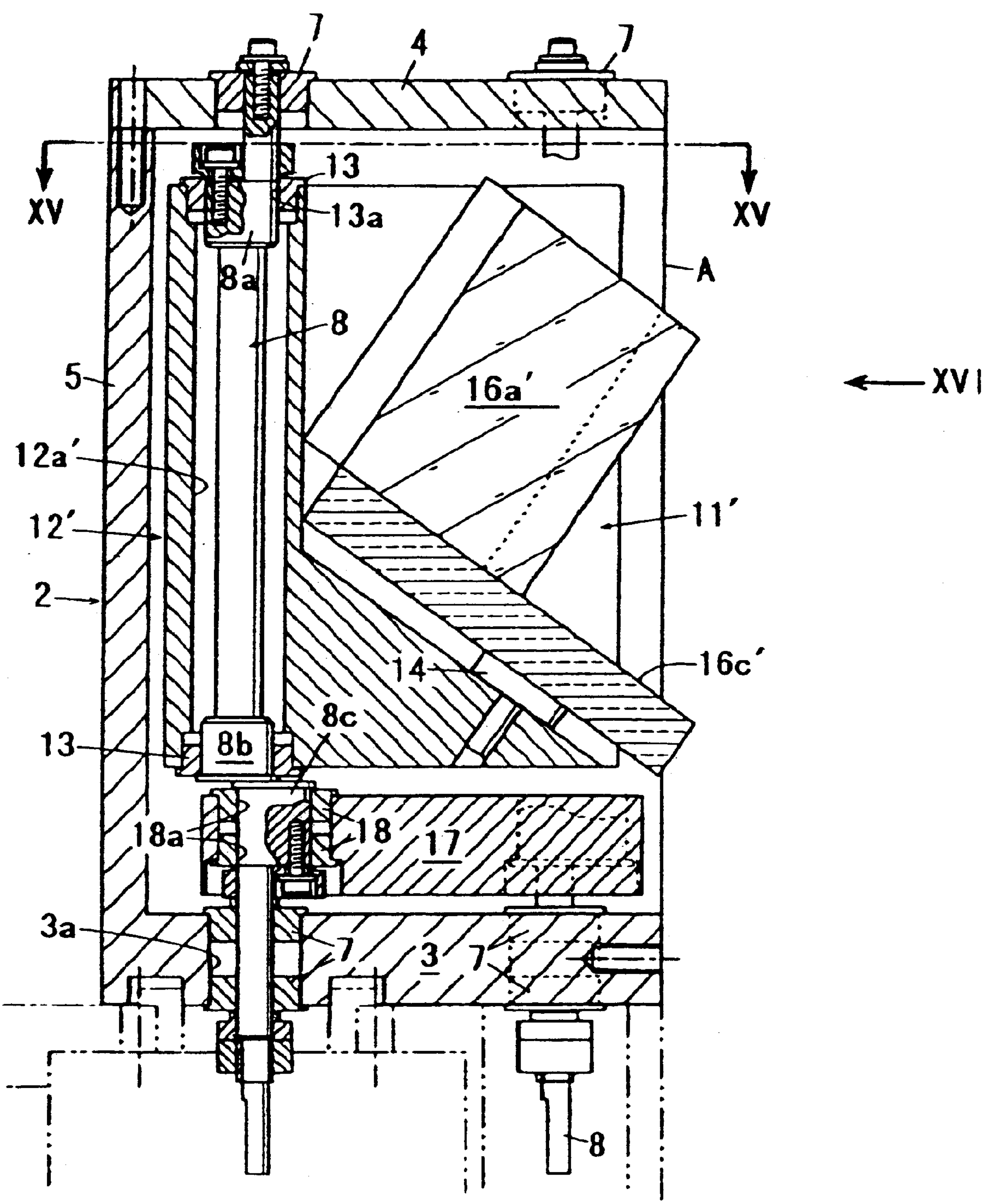
FIG. 14 is a cross-sectional side view of a first light reflecting member of an apparatus in Example 4 for changing the length of the optical path on a cycle.
Figure 15:
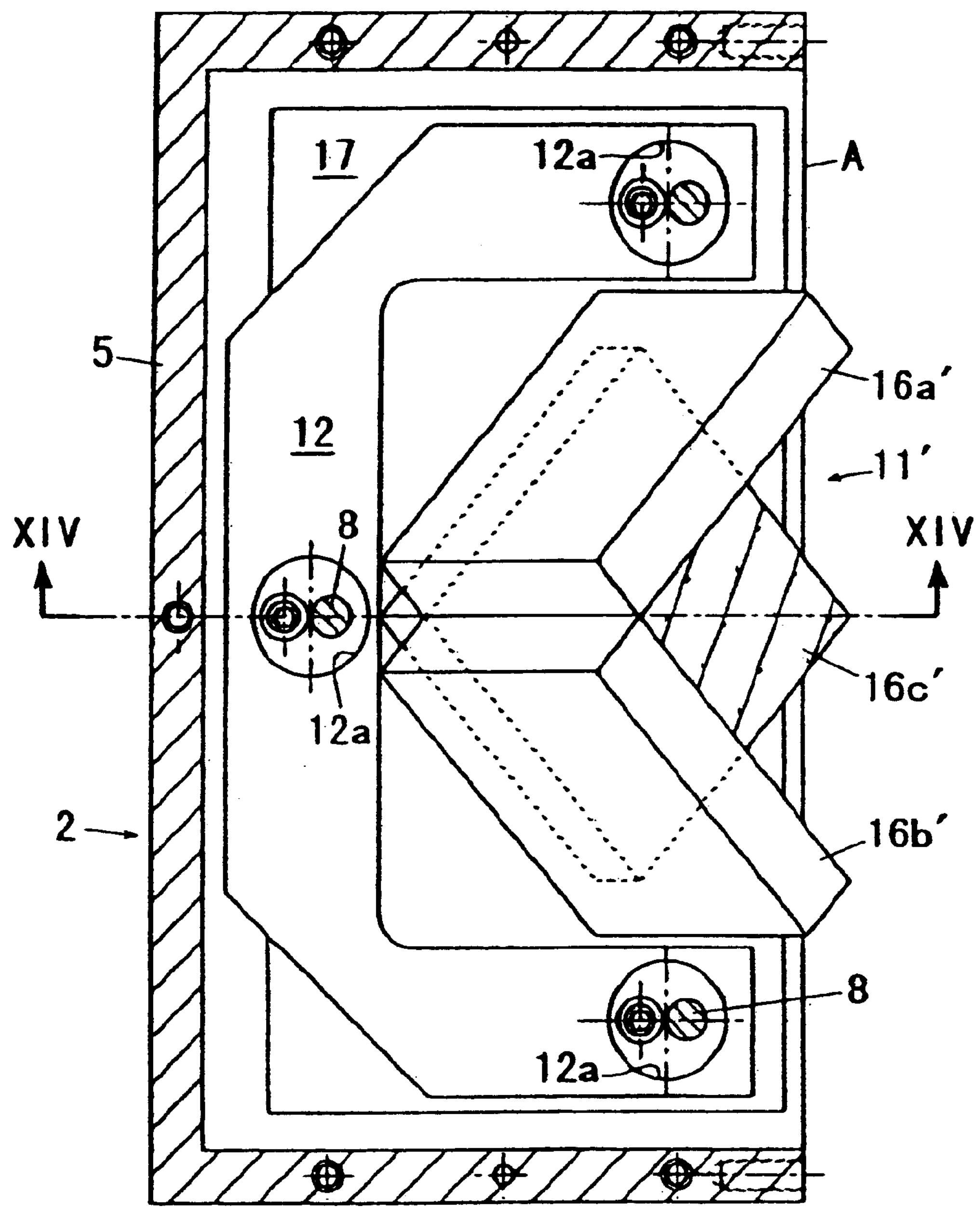
FIG. 15 is a cross-sectional view taken along line XV—XV in FIG. 14.
Figure 16:
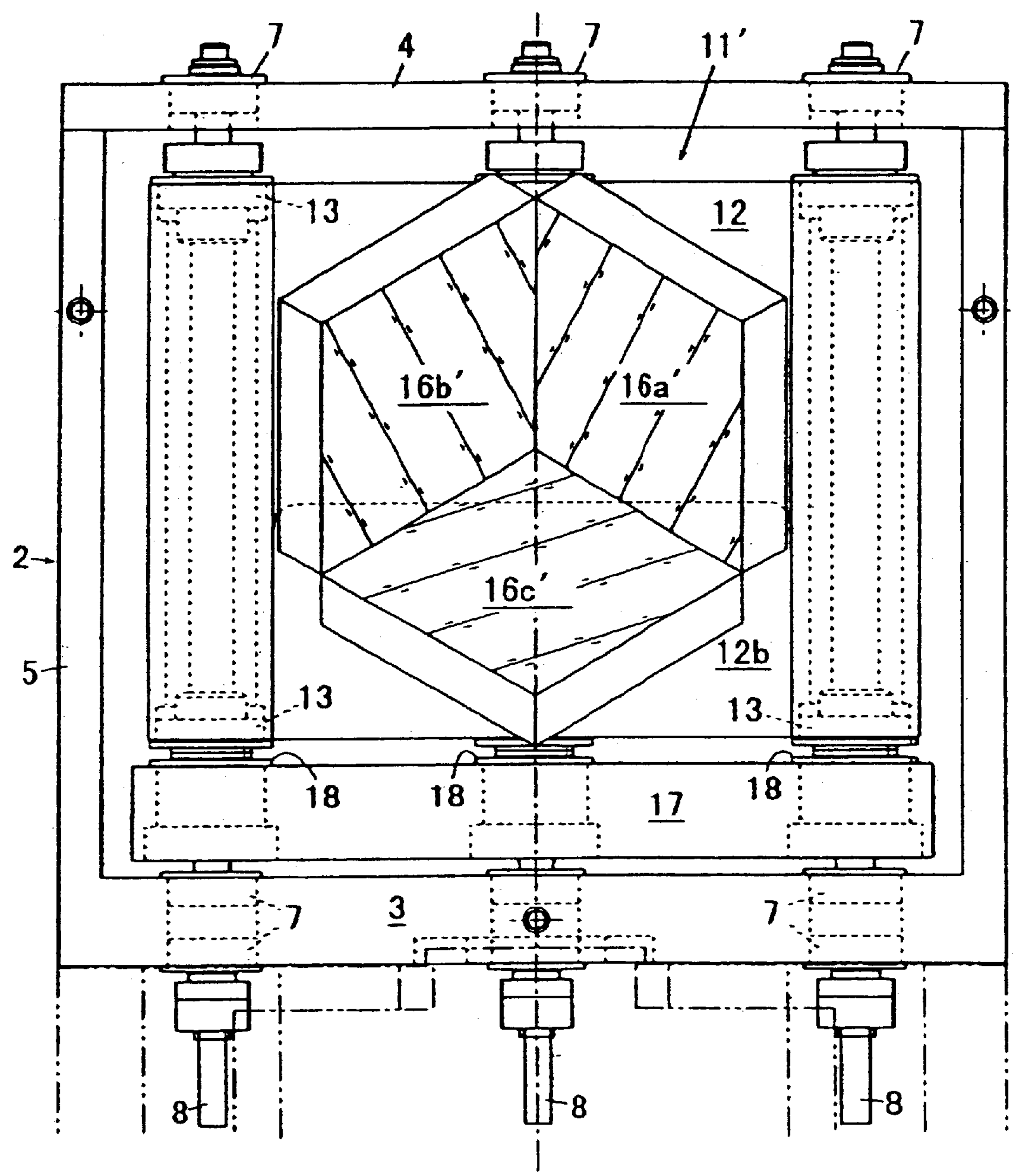
FIG. 16 is a cross-sectional view of a first light reflecting member viewed from the direction of arrow XVI in FIG. 14.

FIGS. 13A to 13C show illustrations of a principal part of the apparatus of the present invention in this Example for changing the length of an optical path on a cycle. FIG. 13A is the front view of light reflecting mirrors of a first light reflecting member (view of the first light reflecting member viewed from the direction in which the emerged light from a beam splitter enters the first light reflecting member). FIG. 13B is a view of the mirrors viewed from the direction of arrow XIIIB in FIG. 13A. FIG. 13C is a view of the mirrors viewed from the direction of arrow XIIIC in FIG. 13A. FIG. 14 shows a side cross-sectional view illustrating a first light reflecting member of an apparatus in this Example for changing the length of an optical path on a cycle. FIG. 15 is a cross-sectional view taken along the line XV—XV in FIG. 14. FIG. 16 is a view of a first light reflecting member viewed along the direction of arrow XVI in FIG. 14.

Apparatus of this Example is different from that of Example 1 in the following points, but the apparatus is constructed in the same manner as in Example 1 shown in FIG. 1 to FIG. 9B in other points.

In FIGS. 13A to 16, the apparatus of the present invention shown in this Example for changing the length of an optical path on a cycle has a corner mirror composed of upper right side light reflecting mirror 16*a*', upper left side light reflecting mirror 16*b*', and lower light reflecting mirror 16*c*' which are perpendicular to one another, and mirror holder 12' supporting the corner mirror described above. The mirror holder 12' has shaft through hole 12*a*'.

Since the motion subordinate to eccentric rotation of the first light reflecting member 11' having a corner mirror composed of the light reflecting mirrors 16*a*', 16*b*', and 16*c*' becomes a stable rotational motion of a small speed fluctuation in the apparatus of this Example, the first light reflecting member 11' can perform a stable reciprocation of a small speed fluctuation at a high speed along the direction in which the incident light which emerged from a beam splitter enters the first light reflecting member.

EXAMPLE 5

Figure 17:
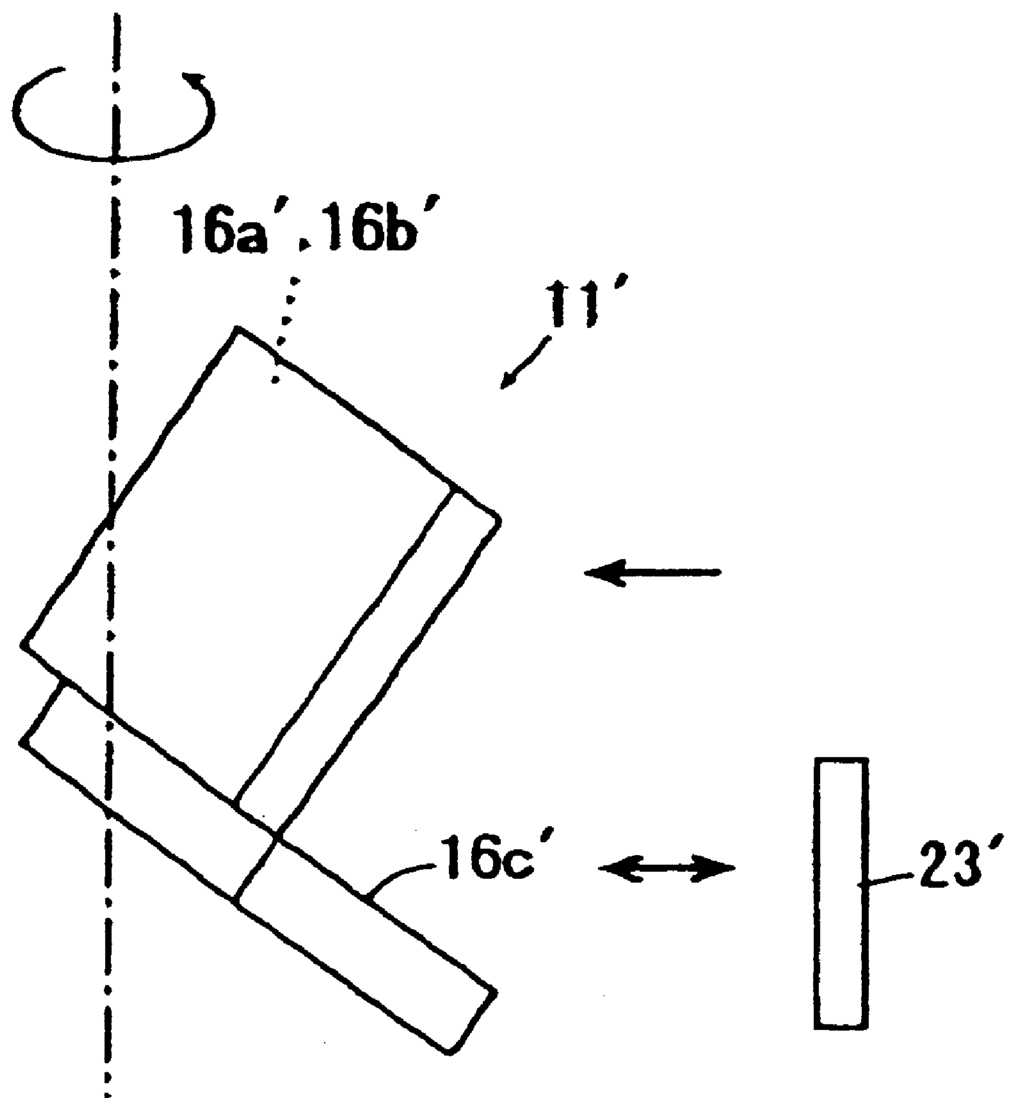
FIG. 17 is an illustration of a principal part of the apparatus of the present invention in Example 5 for changing the length of an optical path on a cycle.

FIG. 17 is an illustration of a principal part of the apparatus of the present invention in this Example for changing the length of an optical path on a cycle.

In FIG. 17, first light reflecting member 11' composed of a corner mirror reflects the incident light from a beam splitter (not shown in the drawing) and emits it as a first reflected light in parallel to the optical path of the incident light and to the opposite direction, and when the first reflected light entered second light reflecting member 23' composed of a plane mirror, the second light reflecting member reflects the light and emits it as a second reflected light which travels in the same optical path as that of the first reflected light to the opposite direction.

The optical beam reflected by the second light reflecting member travels in the same optical path as that through which the light entered, to the opposite direction, and reenters the beam splitter. In this case, the point from which a light emerges from a beam splitter coincides with the point through which the reflected light reenters the beam splitter.

Since the motion subordinate to eccentric rotation of the first light reflecting member 11' having a corner mirror composed of the light reflecting mirrors 16*a*, 16*b*', and 16*c*' becomes a stable motion of a small speed fluctuation in this Example, the first light reflecting member 11' can perform a stable reciprocation of a small speed fluctuation at a high speed along the direction in which the incident light which emerged from a beam splitter and enters the first light reflecting member.

EXAMPLE 6 AND SIMILAR EXAMPLE

Figure 18A:
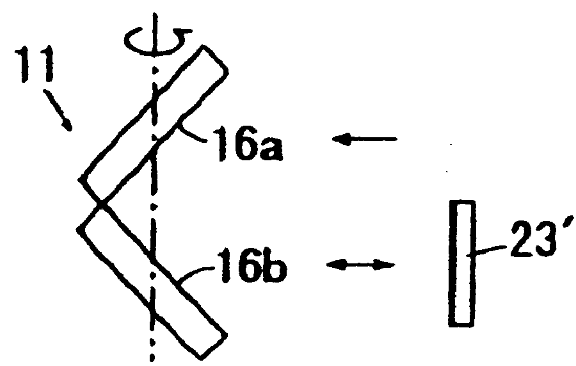
FIGS. 18A to 18C show illustrations of a principal part of the apparatus of the present invention in Example 6 for changing the length of an optical path on a cycle, and that of apparatuses similar thereto.
Figure 18B:
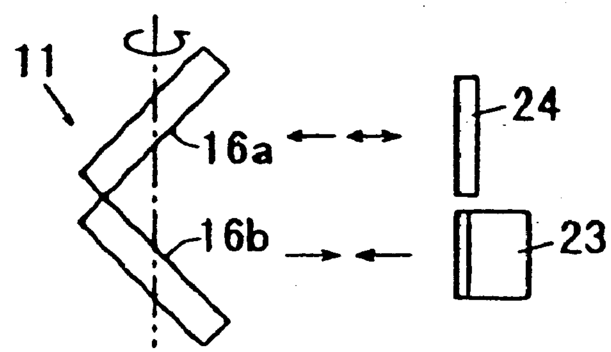
Figure 18C:
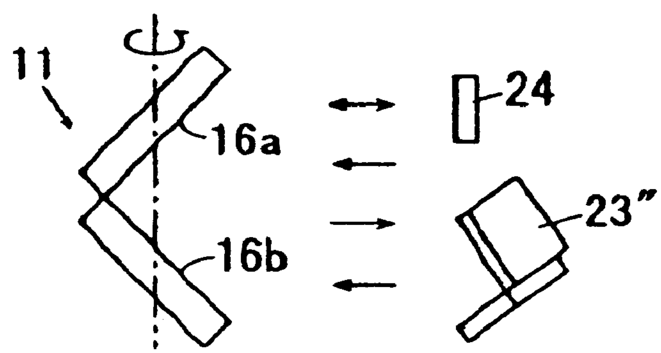

FIGS. 18A to 18C show illustrations of a principal part of the apparatus of the present invention in this Example for changing the length of an optical path on a cycle, and that of apparatuses similar thereto. FIG. 18A shows an example of the apparatuses having a first light reflecting member 11 composed of a vertical arrangement type roof mirror (roof mirror in which a pair of mirrors are arranged above and below) and second light reflecting member 23' composed of a plane mirror. FIG. 18B shows an example of the apparatuses having first light reflecting member 11 composed of a vertical arrangement type roof mirror, second light reflecting member 23 composed of a horizontal arrangement type roof mirror (roof mirror in which a pair of mirrors are arranged from side to side), and third light reflecting member 24 composed of a plane mirror. FIG. 18C shows an example of the apparatuses having first light reflecting member 11 composed of a vertical arrangement type roof mirror, second light reflecting member 23" composed of a corner mirror, and third light reflecting member 24 composed of a plane mirror.

In each of the examples shown in the FIG. 18A to 18C, the emerged light from a beam splitter (not shown in the drawings) is reflected by each of the light reflecting members described above, and the last light reflecting member reflects the incident light and emits it in the same optical path as that of the incident light to the opposite direction. Accordingly, the o reflected light of the incident light which emerged from the beam splitter described above, was reflected by each of the reflecting members described above, and then entered the last light reflecting member travels in the same optical path as that through which the light entered the last light reflecting member, and reenters the beam splitter from the same position as that from which the light first emerged.

In each of the Examples shown in FIGS. 18A to 18C, the orientation of the rotation axis of a first mirror is perpendicular to the direction of the incident light on light reflecting mirrors 16*a* and 16*b*. However, when the reflected light of the incident light which entered the last light reflecting member travels in the same optical path as that through which the light entered the last light reflecting member to the opposite direction, and reenters the beam splitter from the same position as that from which the light first emerged, as in each of the Examples shown in FIGS. 18A to 18C, any orientation will be sufficient for the rotation axis of the first light reflecting mirror.

Since the motion subordinate to eccentric rotation of the first light reflecting member becomes a stable motion of a small speed fluctuation in the apparatus of each of Examples shown in FIGS. 18A to 18C for changing the length of an optical path on a cycle, in the same manner as in the Examples 1 to 5 described above, the length of the optical path from the point where a light is splitted by a beam splitter and emerged therefrom to the point where the light is reflected by a light reflecting member, and finally to the point where the reflected light reenters the beam splitter can be increased or decreased on a cycle at a high speed.

EXAMPLE 7 AND SIMILAR EXAMPLE

Figure 19A:
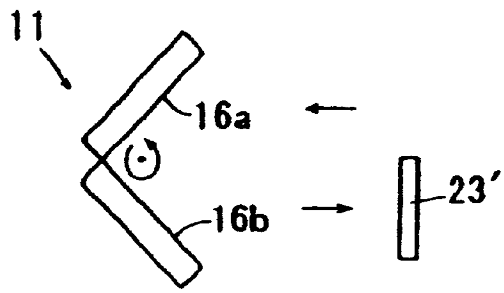
FIGS. 19A to 19D show illustrations of a principal part of the apparatus of the present invention in Example 7 for changing the length of an optical path on a cycle, and that of apparatuses similar thereto.
Figure 19B:
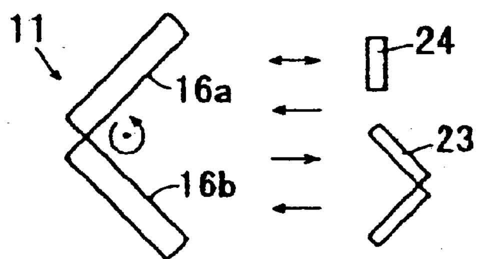
Figure 19C:
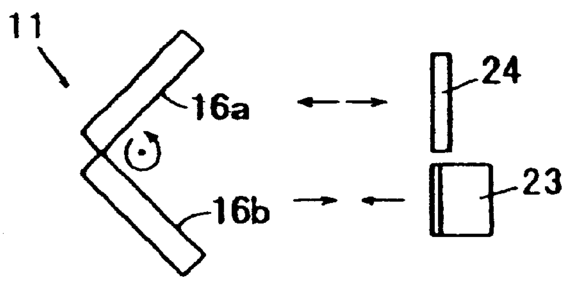
Figure 19D:
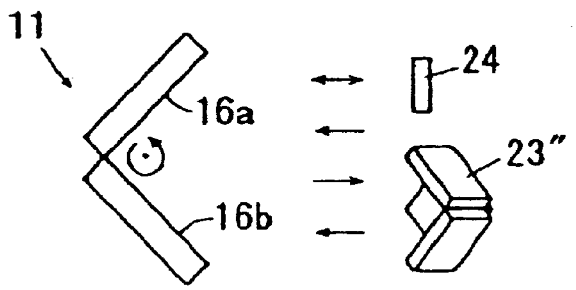

FIGS. 19A to 19D show illustrations of a principal part of an apparatus of the present invention in this Example for changing the length of an optical path on a cycle, and that of apparatuses similar thereto. FIG. 19A shows an example of the apparatuses having first light reflecting member 11 composed of a horizontal arrangement type roof mirror and second light reflecting member 23' composed of a plane mirror. FIG. 19B shows an example of the apparatuses having first light reflecting member 11 composed of a horizon arrangement type roof mirror, second light reflecting member 23 composed of a horizon arrangement type roof mirror, and third light reflecting member 24 composed of a plane mirror. FIG. 19C shows an example of the apparatuses having first light reflecting member 11 composed of a horizontal arrangement type roof mirror, second light reflecting member 27 composed of a vertical arrangement type roof mirror, and third light reflecting member 24 composed of a plane mirror. FIG. 19D shows an example of the apparatuses having first light reflecting member 11 composed of a horizontal arrangement type roof mirror, second light reflecting member 23" composed of a corner mirror, and third light reflecting member 24 composed of plane mirror.

In each of the Examples shown in FIGS. 19A to 19D, the emerged light from a beam splitter (not shown in the drawings) is reflected by each of the light reflecting members described above, and the last light reflecting member reflects the incident light and emits it in the same optical path as that of the incident light to the opposite direction in the same manner as in each of the Examples shown in the FIGS. 18A to 18C. Accordingly, the reflected light of the incident light which emerged from the beam splitter described above, was reflected by each of the reflecting members described above, and then entered the last light reflecting member travels in the same optical path as that through which the light entered the last light reflecting member, in the opposite direction, and reenters the beam splitter from the same position as that from which the light first emerged.

When the reflected light of the incident light which entered the last light reflecting member travels in the same optical path as that through which the light entered the last light reflecting member, to the opposite direction, and reenters the beam splitter from the same position as that from which the light emerged as discussed above, any orientation will be sufficient for the rotation axis of the first light reflecting mirror.

Since the motion subordinate to eccentric rotation of the first light reflecting member becomes a stable motion of a small speed fluctuation in the apparatus of each of Examples for changing the length of an optical length on a cycle in FIGS. 19A to 19D in the same manner as in each of Examples 1 to 5 and Example of FIGS. 18A to 18C, the length of the optical path from the point where a light is splitted by a beam splitter and emerged therefrom to the point where the light is reflected by a light reflecting member, and finally to the point where the reflected light reenters the beam splitter can be increased or decreased on a cycle at a high speed.

EXAMPLE 8 AND SIMILAR EXAMPLE

Figure 20A:
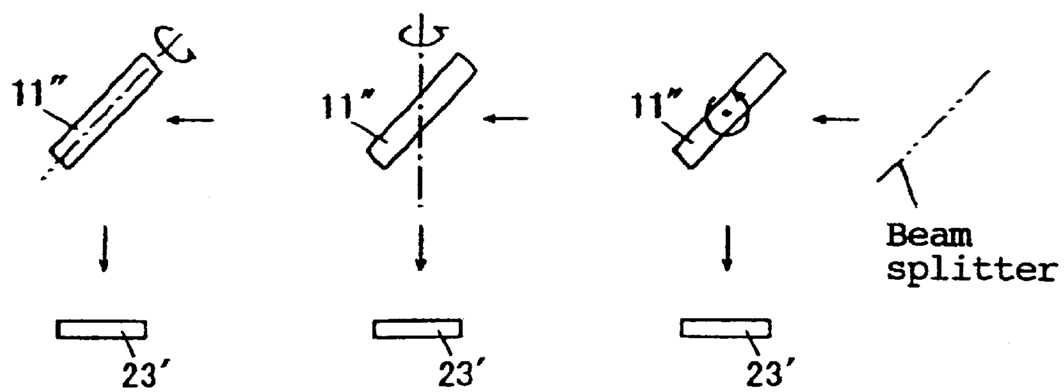
FIGS. 20A to 20C show illustrations of a principal part of the apparatus of the present invention in Example 8 for changing the length of an optical path on a cycle, and that of apparatuses similar thereto.
Figure 20B:
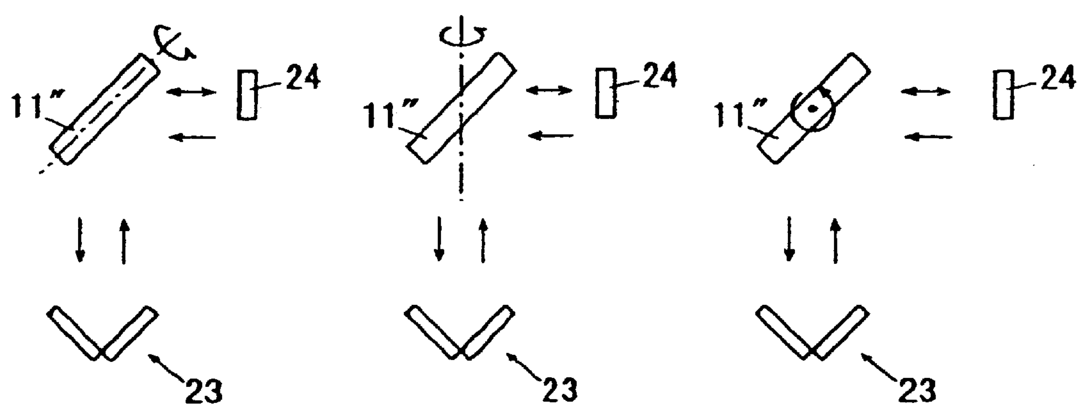
Figure 20C:
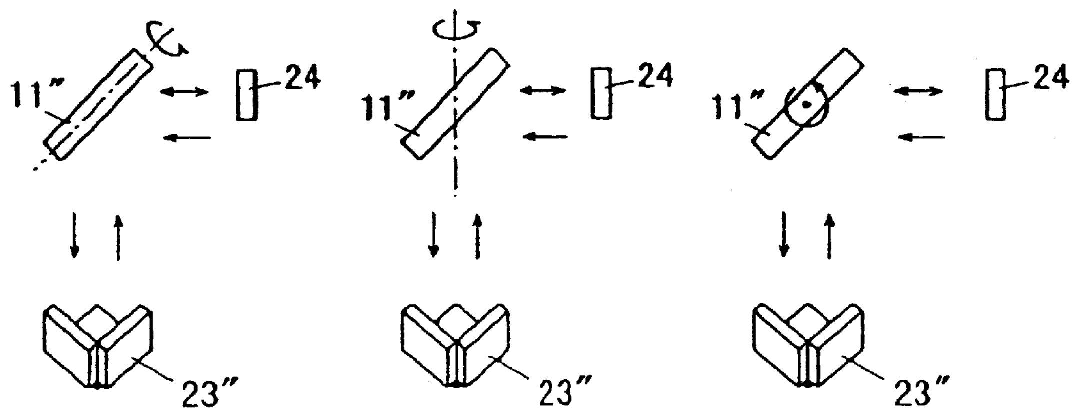

FIGS. 20A to 20C show illustrations of a principal part of the apparatus of the present invention in this Example for changing the length of an optical path on a cycle, and that of apparatuses similar thereto. FIG. 20A shows drawings which illustrate three Examples of the apparatuses which have first light reflecting member 11" composed of a plane mirror and second light reflecting member 23' composed of a plane mirror. In the apparatuses of the drawings, the orientation of rotation axes of the first mirror are different. FIG. 20B shows drawings illustrating three Examples of the apparatuses which have first light reflecting member 11" composed of a plane mirror, second light reflecting member 23 composed of a horizon arrangement type roof mirror, and third light reflecting member 24 composed of a plane mirror.

In the apparatuses of the drawing, the orientation of rotation axes of the first mirror are different. FIG. 20C shows drawings illustrating three example of the apparatuses which have first light reflecting member 11" composed of a plane mirror, second light reflecting member 23" composed of a corner mirror, and third light reflecting member 24 composed of a plane mirror. In the apparatuses of the drawings, the orientation of rotation axes of the first mirror are different.

In each of the Examples shown in FIG. 20A to 20C, the emerged light from a beam splitter (not shown in the drawings) is reflected by each of the light reflecting members described above, and the last light reflecting members 23' and 24 reflect the incident light and emit it in the same optical path as that of the incident light to the opposite direction as in each of the Examples shown in the FIGS. 18A to 19D. Accordingly, the reflected light of the incident light which emerged from the beam splitter, was reflected by each of the reflecting members described above, and then entered the last light reflecting member travels in the same optical path as that through which the light entered the last light reflecting member, in the opposite direction, and reenters the beam splitter from the same position as that from which the light first emerged.

In the example shown in the center among three Examples shown in FIG. 20B, the last light reflecting members can be omitted when the first light reflecting member 11 are integrally connected to the second light reflecting member 23.

As discussed above, when the reflected light of the incident light which entered the last light reflecting member travels in the same optical path as that through which the light entered the last light reflecting member, to the opposite direction, and reenters the beam splitter from the same position as that from which the light first emerged as discussed above, any orientation will be sufficient for the rotation axis of the first light reflecting mirror.

Since the motion subordinate to eccentric rotation of the first light reflecting member 11' becomes a stable motion of a small speed fluctuation in the apparatus of Examples in FIGS. 20A to 20C for changing the length of an optical length on a cycle, in the same manner as in each of Examples 1 to 5 and Examples of FIGS. 18A to 19D, the length of the optical path from the point where a light is splitted by a beam splitter and emerged therefrom to the point where the light is reflected by a light reflecting member, and finally to the point where the reflected light reenters the beam splitter can be increased or decreased on a cycle at a high speed.

EXAMPLE 9 AND SIMILAR EXAMPLES

Figure 21A:
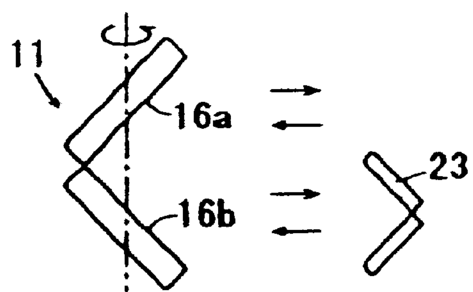
FIGS. 21A to 21D show illustrations of a principal part of the apparatus of the present invention in Example 9 for changing the length of an optical path on a cycle, and that of apparatuses similar thereto.
Figure 21B:
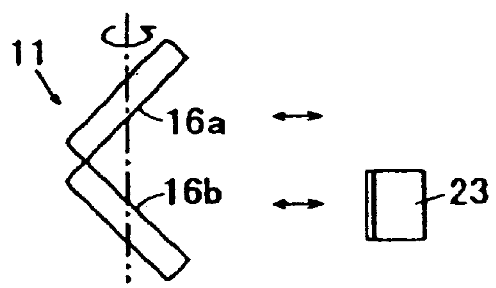
Figure 21C:
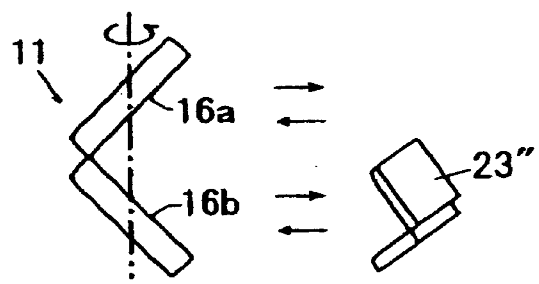
Figure 21D:
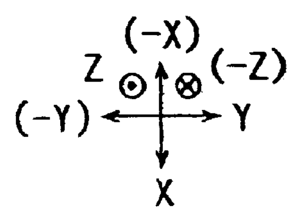
Figure 21D:
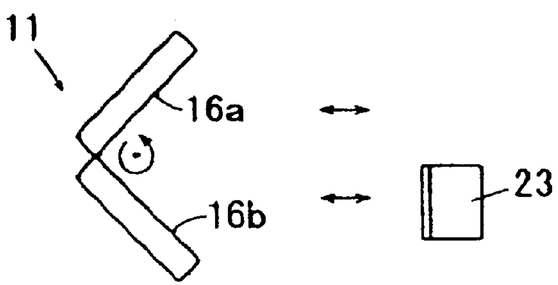

FIGS. 21A to 21D show illustrations of a principal part of the apparatus of the present invention in this Example for changing the length of the optical path on a cycle, and that of apparatuses similar thereto. FIG. 21A shows an Example of the apparatuses having first light reflecting member 11 composed of a vertical arrangement type roof mirror and second light reflecting member 23 composed of a vertical arrangement type roof mirror. FIG. 21B shows an Example of the apparatuses having first light reflecting member 11 composed of a vertical arrangement type roof mirror and second light reflecting member 23 composed of a horizontal arrangement type roof mirror. FIG. 21C shows an Example of the apparatuses having first light reflecting member 11 composed of a vertical arrangement type roof mirror and second light reflecting member 23" composed of a corner mirror. FIG. 21D shows an Example of the apparatuses having first light reflecting member 11 composed of a horizontal arrangement type roof mirror and second light reflecting mirror 23 composed of a vertical arrangement type roof mirror.

In each of the Examples shown in FIG. 21A to 21C, the emerged light from a beam splitter (not shown in the drawings) is reflected by each of the light reflecting members described above, and the positions where the optical beam enters the last light reflecting member (second light reflecting member in FIGS. 21A to 21D) 23 or 23" become the same all the time. The reason is that even when the first light reflecting member 11 moved to the direction of right and left, or moved to the direction perpendicular to the paper, the optical path of the reflected light from lower light reflecting mirror **16*b*** becomes the same.

With the apparatuses shown in FIGS. 21A to FIG. 21C, the function of the apparatus is different between the case when the light enters the last light reflecting member 23 or 23" such that the axis of the incident light comes to the center of the light reflecting member 23 or 23" (position where a plurality of reflecting mirrors are adhered) and the case when the light enters the last light reflecting member from a position deviated from the center.

(When Entered at the Center)

Optical beam of the incident light on the last light reflecting member flips relative to the optical axis of the beam and reflects to the direction opposite to the incident light. In the apparatus shown in FIG. 21A, it flips vertically (from top to bottom); in the apparatus in FIG. 21B, it flips horizontally (from right to left); and in the apparatus in FIG. 21C, it flips vertically and horizontally. In this case, whereas the position of the optical axis of the light which emerges from the beam splitter (not shown in the drawings) coincides with the position of the optical axis of the light which is reflected by each of the light reflecting members 11, 23, or 23" and then reenters the beam splitter, the beam of the emerging light and that of reentering light are flipped relative to the optical axis.

(When Entered at a Position Deviated from the Center)

Last light reflecting member reflects the incident light in an optical path parallel to that of the incident light to the opposite direction. Accordingly, the light emerged from a beam splitter is reflected by each of the light reflecting members, and the reflected light of the incident light to the last light reflecting member travels in an optical path parallel to that through which the light entered therein, to the opposite direction, and reenters the beam splitter at a position different from that where the light first emerged, in a flipped condition.

However, the position where the light reflected by the light reflecting members reenters at the beam splitter is all the time constant. Accordingly, measuring of the interferogram becomes possible by arranging a fixed mirror (not shown in the drawings) which reenters the other light (the other light splitted by the beam splitter and emerged therefrom) in the beam splitter such that the reentering positions of the lights emerged from the beam splitter coincide. When the optical beam reflected by each of the light reflecting members reenters the beam splitter in flipped condition, the light which is reflected by the fixed mirror (not shown in the drawings) and reenters the beam splitter is also flipped.

Now, in FIG. 21D, fore and aft direction is assumed to be X axis, right and left direction: Y axis, and up and down direction: Z axis; and the direction or side indicated by arrow X, −X, Y, −Y, Z, or −Z is assumed to be fore, aft, right, left, upper, or lower direction; or fore, aft, right, left, upper, or lower side, respectively.

Further, in FIG. 21D, the symbol of "○" having "•" therein means the arrow facing from the back of the paper toward the front of the paper, and the symbol of "○" having "X" therein means the arrow facing from the front of the paper toward the back of the paper.

In the Example shown in FIG. 21D, the light emerged from a beam splitter (not shown in the drawing) is reflected by first light reflecting member 11, and the position at which the light enters the last light reflecting member (second light reflecting member in FIGS. 21A to 21D) 23 varies in the direction of X axis. When this incident light is reflected by the second light reflecting member 23 toward the first light reflecting member 11, the function of the apparatus is different between the case when the light enters at the center of the second light reflecting member (position where a plurality of light reflecting mirrors are adhered) and the case when the light enters at a position deviated from the center.

(When Entered at the Center)

In the same manner as in FIGS. 21A to FIG. 21C, whereas the position of the optical axis of the light which emerges from a beam splitter (not shown in the drawing) coincides with the position of the optical axis of the light which is reflected by each of the light reflecting members 11 and 23 and then reenters the beam splitter, the beam of the emerged light and that of the reentered light are flipped relative to the optical axis of the light.

(When Entered at a Position Deviated from the Center)

When the incident light is reflected by the second light reflecting member 23 toward the first light reflecting member 11, the position of the reflected light is not varied in the direction of X axis but is varied in the direction of Z axis. Accordingly, the light which is reflected by the first light reflecting member 11 towards the beam splitter (not shown in the drawing) is not varied in the direction of X axis, but varied only in the direction of Z axis. Thus, the light which emerges from a beam splitter, is reflected by each of the light reflecting members 11 and 23, and then reenters the beam splitter reenters, in vertically flipped condition, at a position different from that where the light first emerged from the beam splitter.

However, even in the case of FIG. 21D, the reentering position at the beam splitter is all the time constant. Accordingly, measuring of the interferogram becomes possible by arranging a fixed mirror (not shown in the drawing) which reenters the other light, which was splitted by a beam splitter and emerged therefrom, in the beam splitter such that the reentering positions of each of the lights emerged from the beam splitter coincide. When the light reflected by each of the light reflecting members reenters the beam splitter in flipped condition, the light which is reflected by the fixed mirror (not shown in the drawing) and reenters the beam splitter is also flipped.

Since the motion subordinate to eccentric rotation of the first light reflecting member 11 becomes a stable motion of a small speed fluctuation in the apparatus of each of Examples in FIGS. 21A to 21D for changing the length of an optical length on a cycle in the same manner as in each of Examples 1 to 5 and each of Examples of FIGS. 18A to 20C, the length of the optical path from the point where a light is splitted by a beam splitter and emerges therefrom to the point where the light is reflected by a light reflecting member, and finally to the point where the reflected light reenters the beam splitter can be increased or decreased on a cycle at a high speed.

Further, in Example shown in FIG. 21B and FIG. 21D, the orientation of the rotation axis may be any one.

EXAMPLE 10 AND SIMILAR EXAMPLE

Figure 22A:
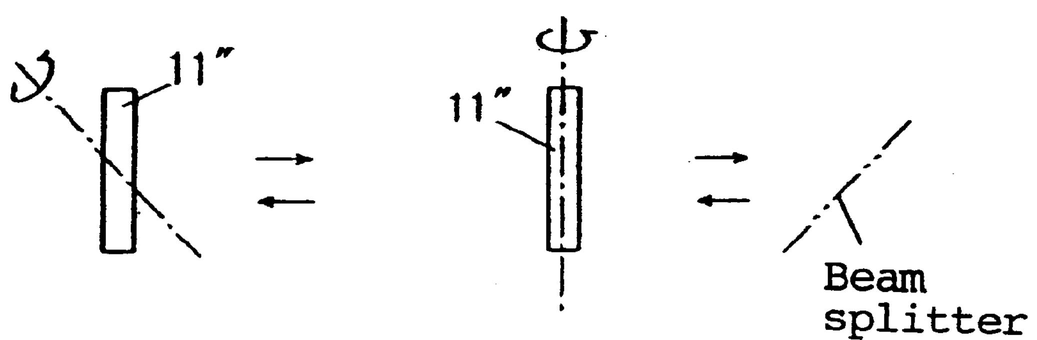
FIGS. 22A and 22B show illustrations of a principal part of the apparatus of the present invention in Example 10 for changing the length of an optical path on a cycle, and that of apparatuses similar thereto.
Figure 22B:
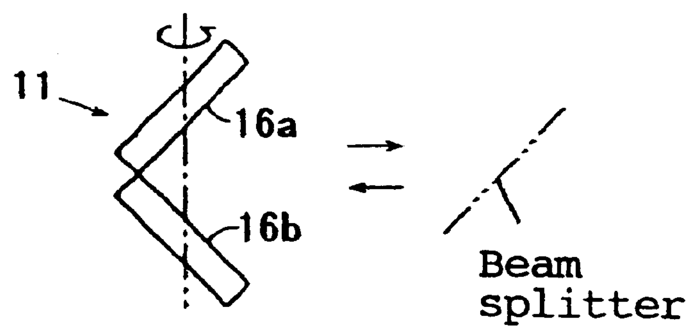

FIGS. 22A and 22B show illustrations of a principal part of the apparatus of the present invention in this Example for changing the length of an optical path on a cycle, and that of an apparatus similar thereto. FIG. 22A shows an example of the apparatuses in which only first light reflecting member 11" composed of plane mirrors is used. FIG. 22B is an example of the apparatuses in which only light reflecting member 11 composed of a vertical arrangement type roof mirror is used.

In the Example shown in the FIG. 22A, the emerged light from a beam splitter is reflected by the first light reflecting member 11" and emitted in the optical path of the incident light to the opposite direction, and reenters the beam splitter at the same position as that where the light first emerged.

In the Example shown in FIG. 22B, when the emerged light from a beam splitter is reflected by the first light reflecting member 11 toward the beam splitter, the function of the apparatus is different between the case when the light enters at the center of the light reflecting member 11 (position where a plurality of light reflecting mirrors are adhered) and the case when the light enters at a position deviated from the center.

(When Entered at the Center)

Whereas the position of the optical axis of the light which emerges from a beam splitter coincides with the position of the optical axis of the light which is reflected by the light reflecting members 11 and then reenters the beam splitter, the beam of the emerged light and that of the reentered light are flipped relative to the optical axis of the light.

(When Entered at a Position Deviated from the Center)

When the incident light is reflected by the first light reflecting member 11 toward the beam splitter, the position of the reflected light varies in a vertical direction (up and down direction in the drawing). Accordingly, the light which is reflected from the first light reflecting member 11 toward the beam splitter is in parallel and in the opposite direction. Thus, the light which emerges from the beam splitter, is reflected by the first light reflecting member 11, and then reenters the beam splitter reenters in the beam splitter at a position different from that where the light first emerged, in a vertically flipped condition.

However, the reentering position at the beam splitter is all the time constant. Accordingly, measuring of the interferogram becomes possible by arranging a fixed mirror (not shown in the drawings) which reenters the other light, which is splitted by a beam splitter and emerges therefrom, in the beam splitter such that the reentering positions of each of the lights emerged from the beam splitter coincide.

When the light reflected by each of the light reflecting members reenters the beam splitter in flipped condition, the light which is reflected by the fixed mirror (not shown in the drawings) and reenters the beam splitter is also flipped.

Further, in the Example shown in FIG. 22A, the orientation of the rotation axis may be any one.

Since the motion subordinate to eccentric rotation of the first light reflecting member 11 becomes a stable motion of a small speed fluctuation in the apparatus of each of Examples in FIG. 22A and FIG. 22B for changing the length of an optical length on a cycle, in the same manner as in each of Examples 1 to 5 and Examples of FIGS. 18A to 21D, the length of the optical path from the point where a light is splitted by a beam splitter and emerges therefrom to the point where the light is reflected by a light reflecting member, and finally to the point where the reflected light reenters the beam splitter can be increased or decreased on a cycle at a high speed.

EXAMPLE 11

Figure 23:
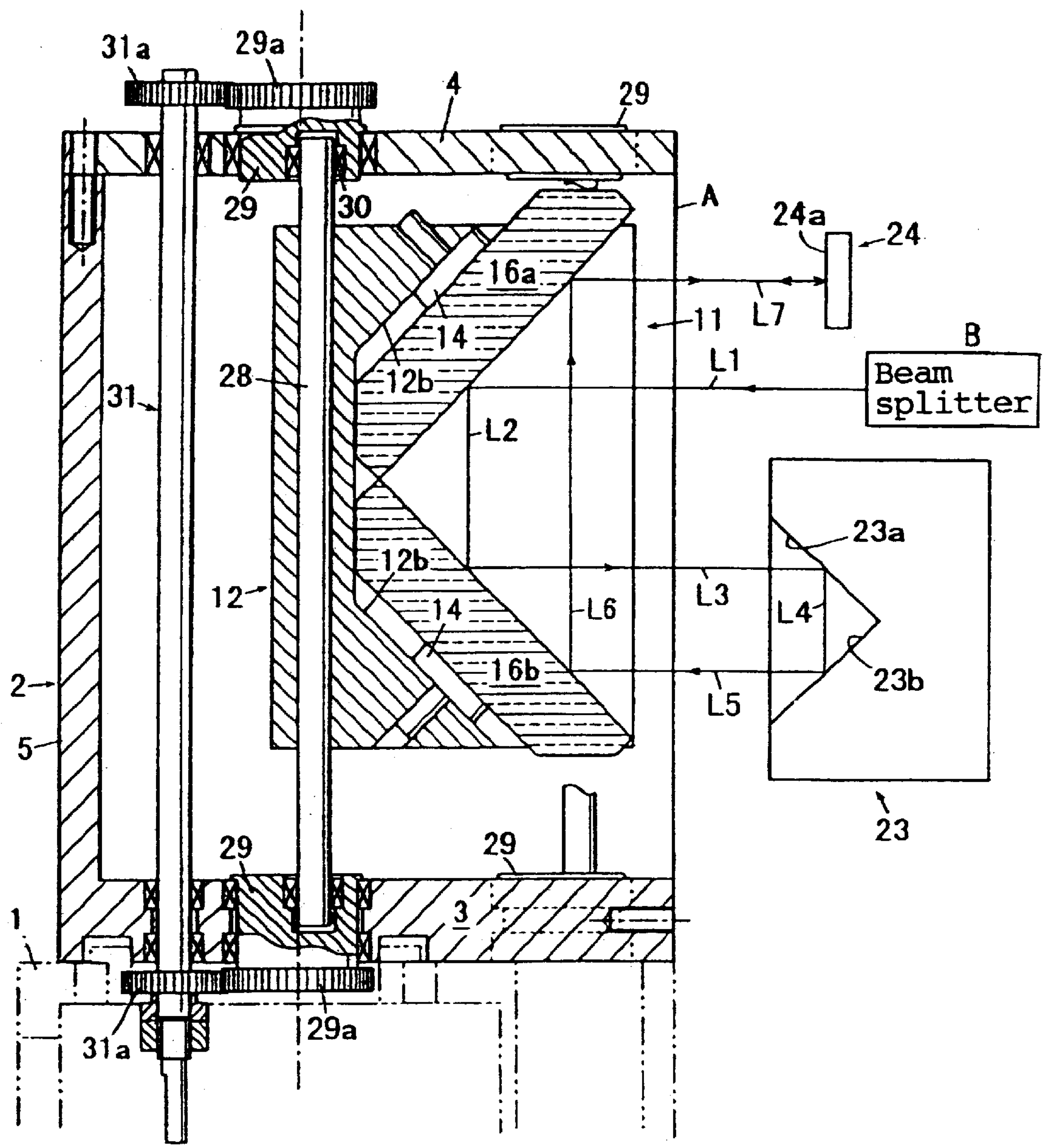
FIG. 23 shows an illustration of the apparatus of the present invention in Example 11 and corresponds to FIG. 2 showing the apparatus in Example 1.

FIG. 23 shows an illustration of the apparatus of the present invention in this Example and corresponds to FIG. 2 showing the apparatus in Example 1.

In the descriptions in this Example, the elements corresponding to those which constitute the apparatus of Example 1 are provided with the same symbols as those in Example 1, and detailed explanations are omitted for brevity.

Apparatus of this Example is different from that of Example 1 in the following points, but constructed in the same manner as in Example 1 in other points.

This Example shows an example of apparatuses for making the first light reflecting member perform a constant orientation, circular locus motion. Also, it shows a mechanism for moving a light reflecting member.

In this Example, balancer 17 in Example 1 shown in the FIG. 2 described above is omitted, and three linear axes (shafts which moves on a circular locus) 28 are fixed to first light reflecting member 11. Both upper and lower ends of the circular locus moving shafts 28 are supported through bearings 30 and 30 at a position which is eccentric from the rotation center of rotating members 29 and 29 rotatably supported by supporting frame 2.

To a pair of rotating members 29 and 29 which support the both upper and lower ends of one circular locus moving shaft 28 among the three circular locus moving shafts 28 described above, gears 29*a* and 29*a* are integrally connected. The gears 29*a* and 29*a* are being engaged with gears 31*a* and 31*a* supported by gear supporting shaft 31. Gear supporting shaft 31 is connected to rotating shaft 21*a* of motor unit (rotational driving apparatus) 21 (see FIG. 1). Rotation of the rotating shaft 21*a* described above is transferred to rotating members 29 and 29 through gear supporting shaft 31, gears 31*a* and 31*a*, and 29*a* and 29*a*.

When the rotating members 29 and 29 rotate, the circular locus moving shaft 28 moves along the circular locus with the rotation center of the rotating member 29 being its center of the moving. At this time, the orientation of the circular locus moving shaft 28 is constant.

Accordingly, the first light reflecting member 11 integrally connected to circular locus moving shaft 28 performs a constant orientation, circular locus motion.

Means (28 to 31) for converting a turning effect into a constant orientation, circular locus motion to make the first light reflecting member 11 perform a constant orientation, circular locus motion by the turning effect of the motor unit (circular driving apparatus) 21 (see FIG. 1) is constructed by elements indicated by the symbols 28 to 31 described above. Constant orientation, circular locus motion of the first light reflecting member 11 in this Example is the same motion as the motion subordinate to eccentric rotation in the Example 1.

Since the constant orientation, circular locus motion of first light reflecting member 11 having the light reflecting mirrors 16*a*, 16*b* in this Example becomes a stable rotational motion of a small speed fluctuation in the same manner as the motion subordinate to eccentric rotation in Example 1, the first light reflecting member 11 can perform a stable reciprocation of a small speed fluctuation at a high speed along the direction of the incident light which emerged from the beam splitter and enters the first light reflecting member.

EXAMPLE 12

Figure 24:
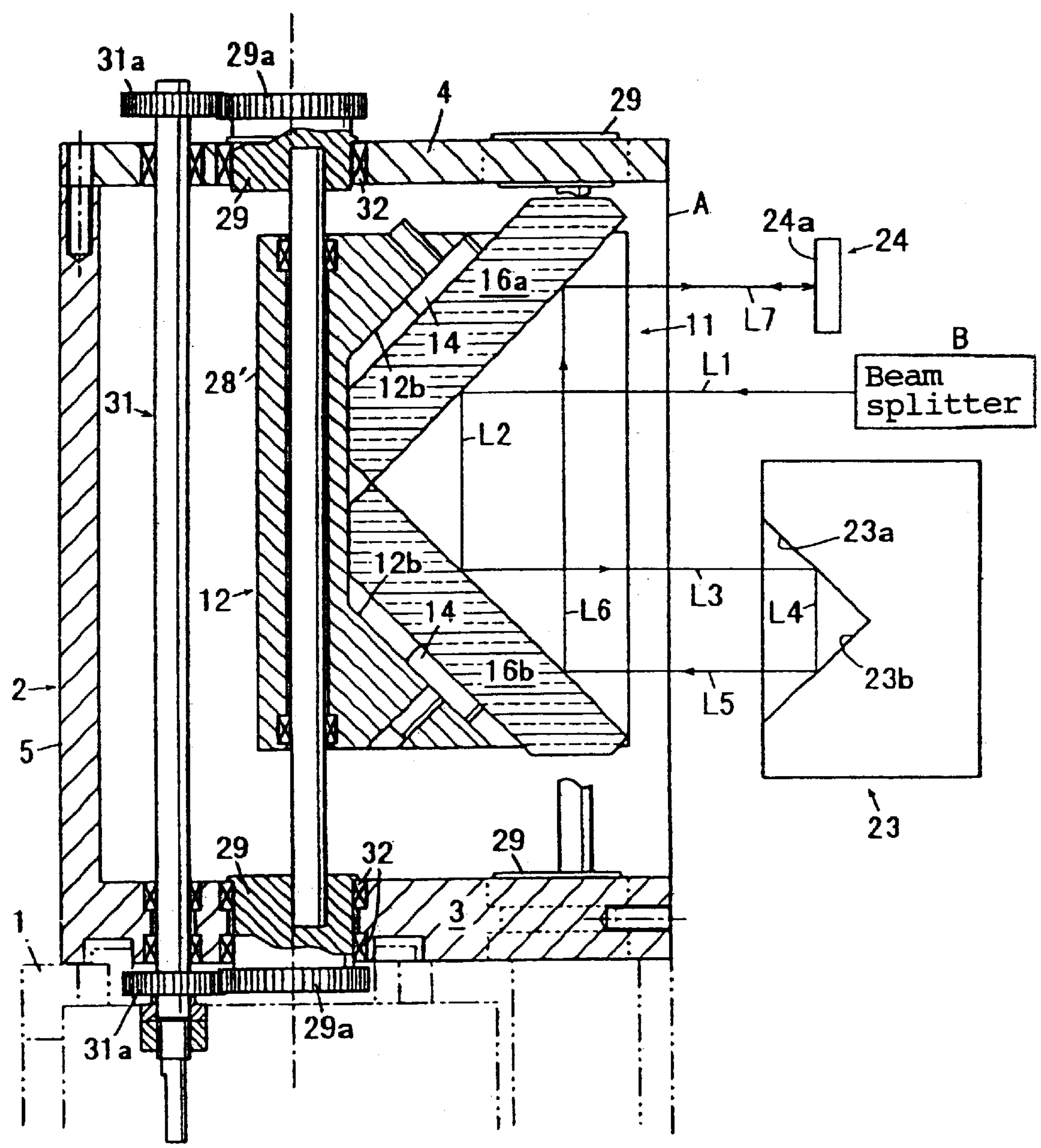
FIG. 24 is an illustration of the apparatus of the present invention in Example 12 and corresponds to FIG. 23 showing the apparatus in Example 11.

FIG. 24 is an illustration of the apparatus of the present invention in this Example and corresponds to FIG. 23 showing the apparatus in Example 11.

In the descriptions in this Example, the elements corresponding to those which constitute the apparatus of Example 11 are provided with the same symbols, and detailed explanations are omitted for brevity.

Apparatus of this Example is different from that of Example 11 in the following points, but constructed in the same manner as in Example 11 in other points.

In this Example, three linear axes (shafts which moves on a circular locus) 28' are rotatably fixed to the first light reflecting member 11 through bearing 32. Both upper and lower ends of the circular locus moving shafts 28' are supported by fixing at a position which is eccentric from the rotation center of rotating members 29 and 29 rotatably supported by supporting frame 2.

Rotation of the rotating shaft 21*a* of the motor unit (rotational driving apparatus) 21 (see FIG. 1) is transferred to rotating members 29 and 29 through gear supporting shaft 31, gears 31*a* and 31*a*, and 29*a* and 29*a*.

When the rotating members 29 and 29 described above rotate, the circular locus moving shaft 28' moves along the circular locus with the rotation center of the rotating member 29 being its center of the moving. At this time, the first light reflecting member 11 rotatably connected to circular locus moving shaft 28' performs a constant orientation, circular locus motion.

Means (28', 29, 31 to 32) for converting a turning effect into a constant orientation, circular locus motion to make the first light reflecting member 11 perform a constant orientation, circular locus motion by the turning effect of the motor unit (circular driving apparatus) 21 (see FIG. 1) is constructed by elements indicated by the symbols 28', 29, and 31 to 32 described above.

Since the constant orientation, circular locus motion of the first light reflecting member 11 having the light reflecting mirrors 16*a* and 16*b* in this Example becomes a stable rotational motion of a small speed fluctuation in the same manner as in Example 11, the first light reflecting member 11 can perform a stable reciprocation of a small speed fluctuation at a high speed along the direction of the incident light which emerged from the beam splitter and enters the first light reflecting member.

EXAMPLE 13

Figure 25A:
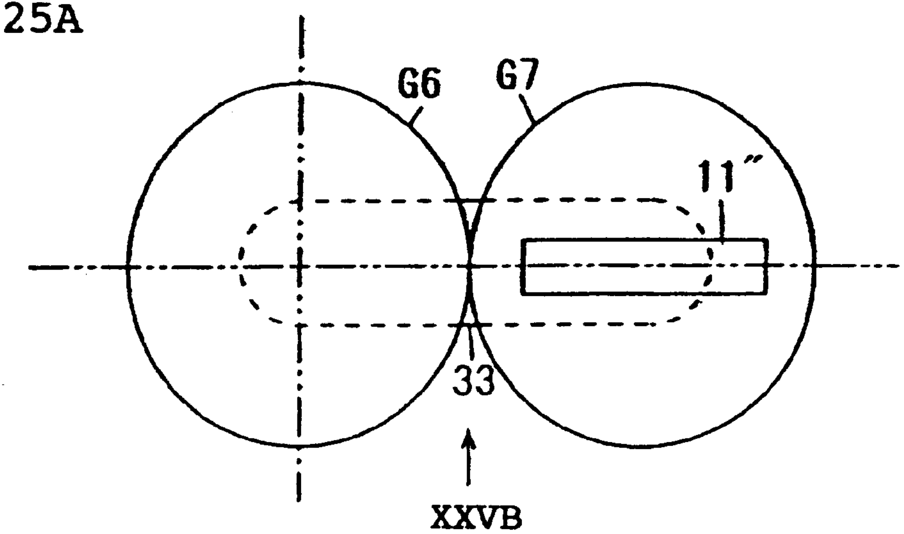
FIGS. 25A and 25B are illustrations of the apparatus of the present invention in Example 13, and shows another structure for supporting a light reflecting member so as to perform a circular locus motion with the orientation of the light reflecting member being constant.
Figure 25B:
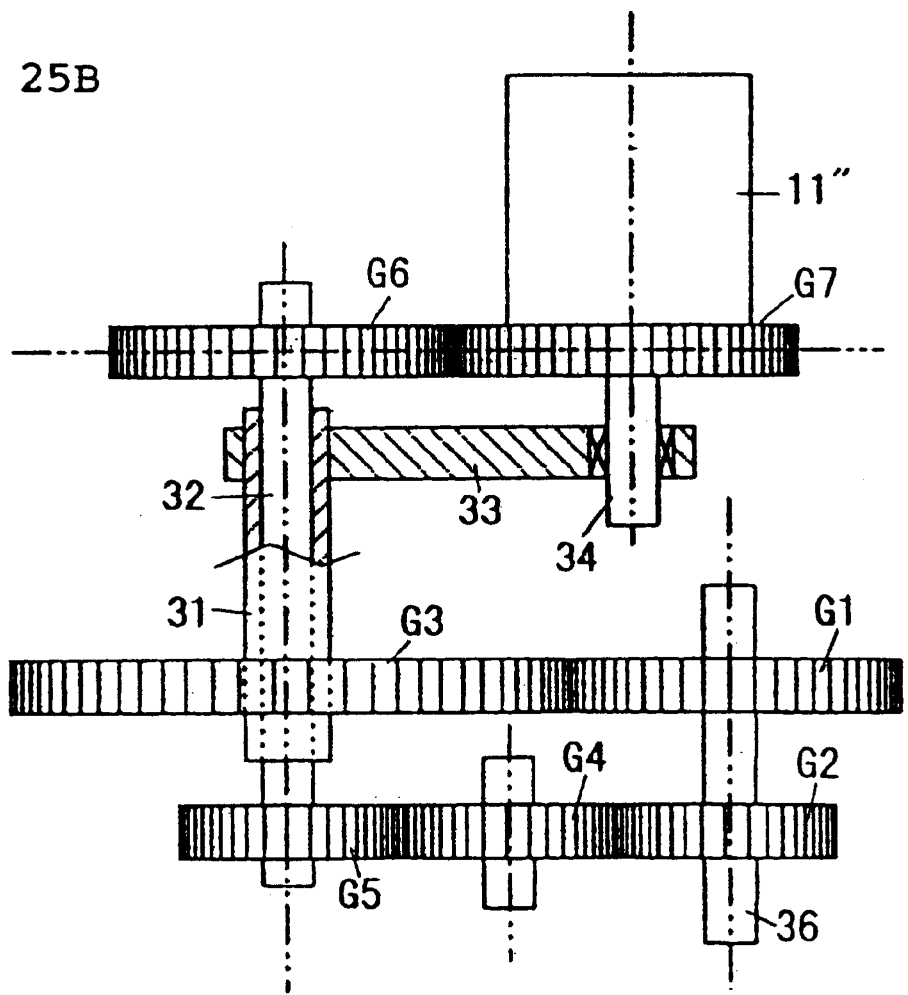
Figure 26A:
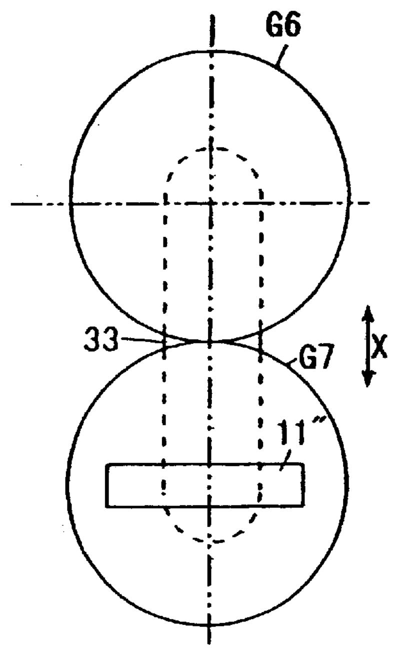
FIGS. 26A to 26C show drawings illustrating functions of the apparatus in Example 13.
Figure 26B:
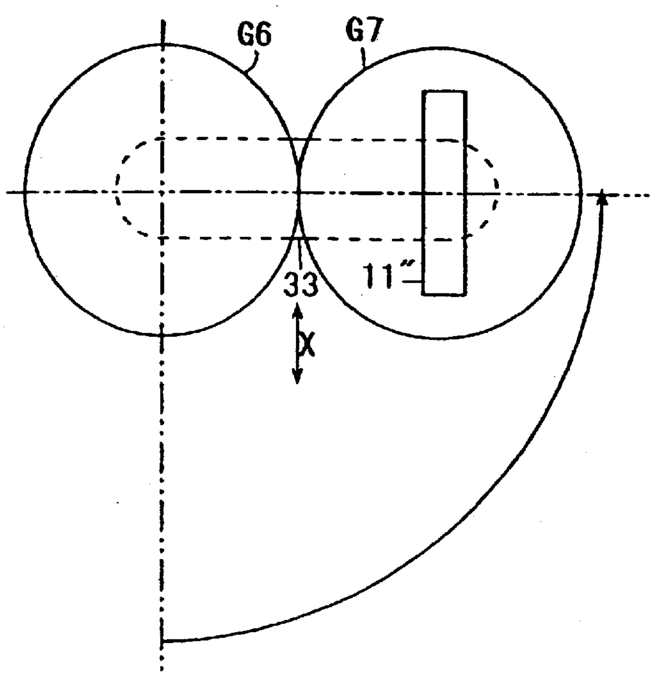
Figure 26C:
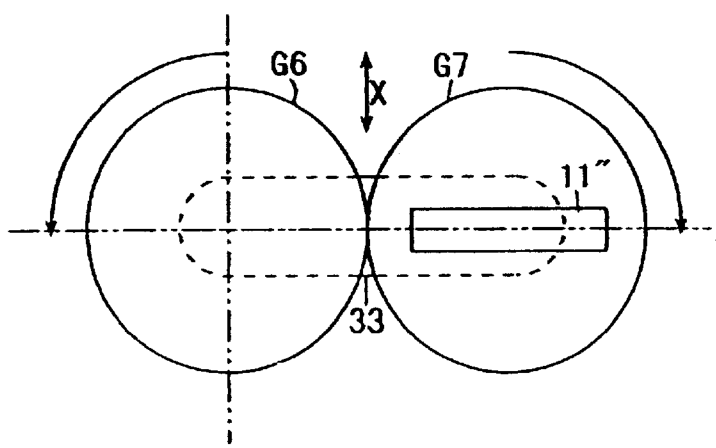
Figure 27:
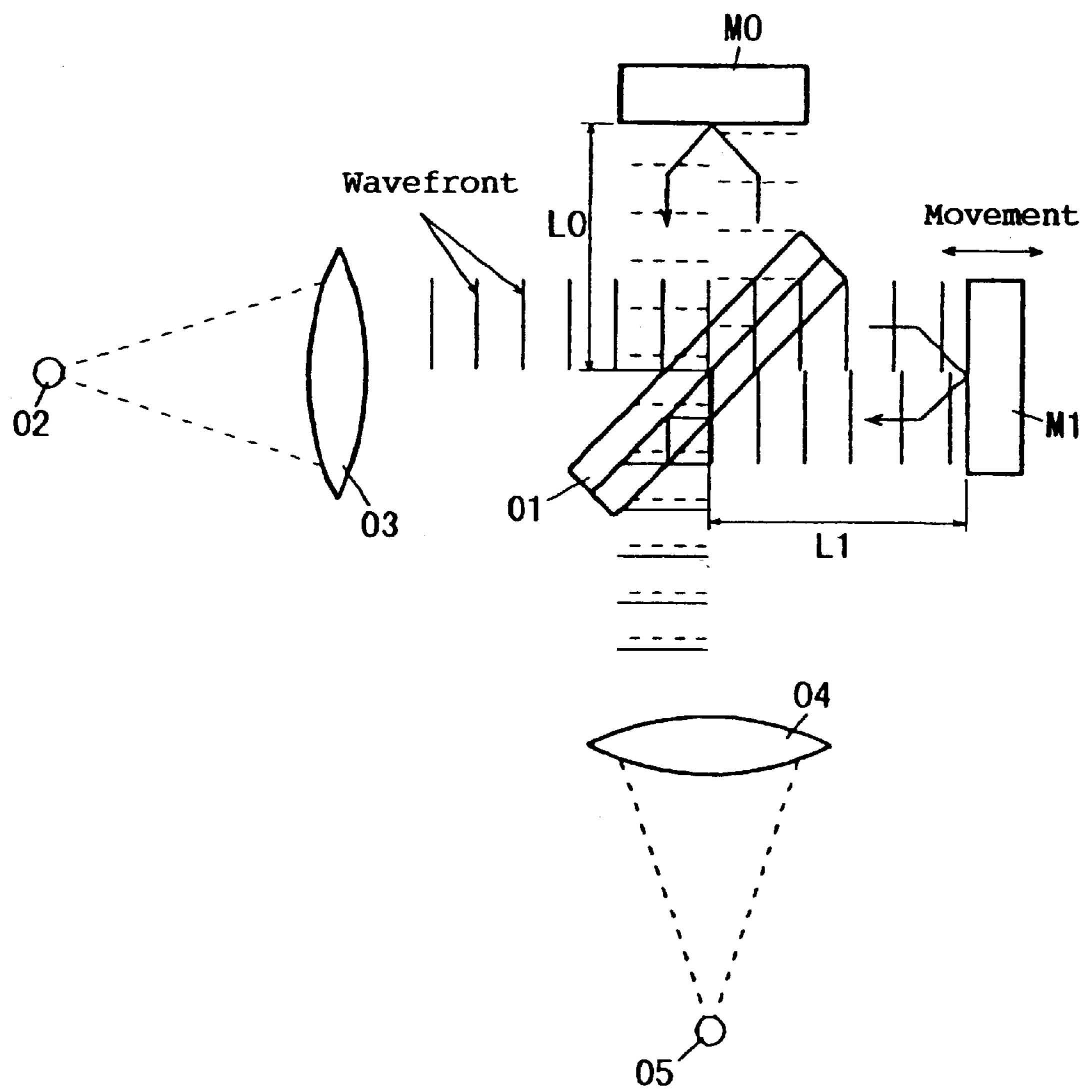
FIG. 27 is an illustration of a general purpose Michelson interferometer.
Figure 28A:
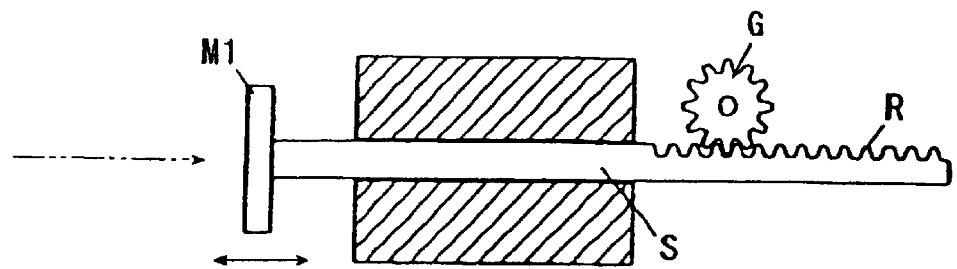
FIGS. 28A to 28D show illustrations of apparatuses for moving a moving mirror (apparatuses for moving light reflecting member) used in conventional interferometers.
Figure 28B:
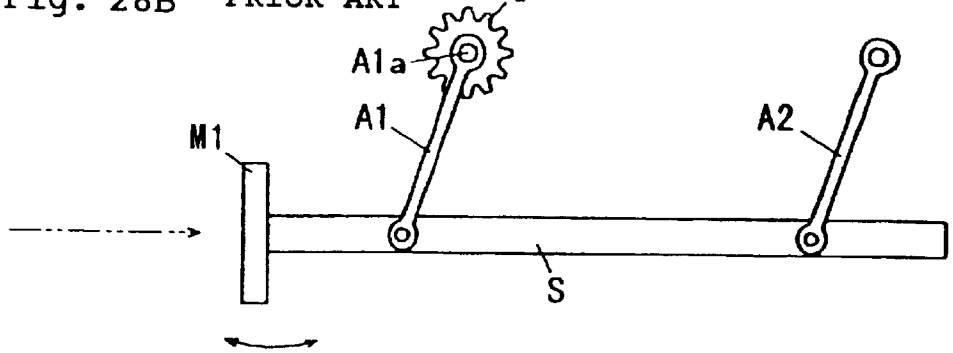
Figure 28C:
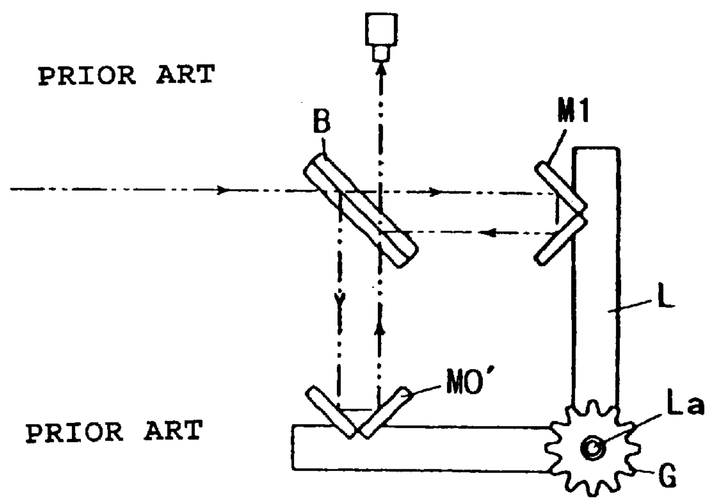
Figure 28D:
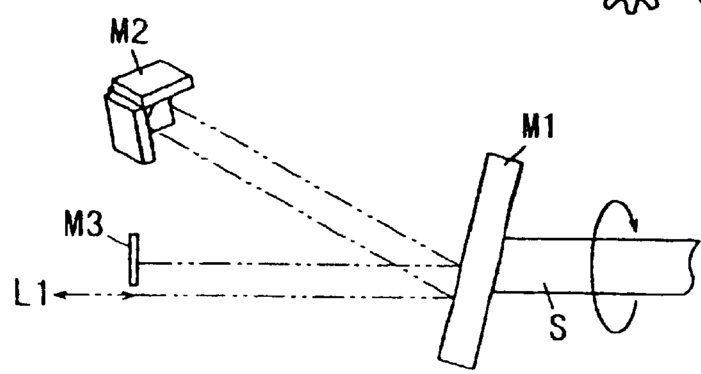

FIGS. 25A and 25B show illustrations of the apparatus of the present invention in this Example, and shows another structure for supporting a light reflecting member so as to perform a constant orientation, circular locus motion. FIG. 25A is the plane view, and FIG. 25B is the front view of the apparatus viewed from the direction of arrow XXVB in FIG. 25A. FIGS. 26A to 26C show illustrations explaining the function of the apparatus in this Example.

In FIG. 25B, outer rotating shaft 31, and inner rotating shaft 32 rotatably placed inside the outer rotating shaft 31 are rotatably supported by a frame not shown in the drawing. At the tip end of arm 33 fixed to the outer rotating shaft 31, mirror supporting shaft 34 is rotatably supported. At the tip end of mirror supporting shaft 34, first light reflecting member 11 is supported.

Gear G1 and gear G2 are fixed to driving shaft 36 for rotationally driving the outer rotating shaft 31 and the inner rotating shaft 32. Gear G1 is engaged with gear G3 fixed to the outer rotating shaft 31. Number of gear tooth of gear G3 is twice as many as that of gear G1. Further, gear G2 is engaged through gear G4 with gear G5 fixed to inner rotating shaft 32. Number of the gear tooth of the gears G2, G4, and G5 are the same.

Accordingly, the rotating angular velocity of inner rotating shaft 32 is twice as high as that of outer rotating shaft 31.

Gear G6 fixed to an upper portion of inner rotating shaft 32 is engaged with gear G7 fixed to the mirror supporting shaft 34.

Numbers of the gear tooth of gears G6 and G 7 are the same. Accordingly, the rotating angular velocity of gears G6 and G7 are the same and the direction of their rotation is opposite.

In the state of FIG. 26A, when arm 33 and gear G6 was rotated counterclockwise at the same angular velocity, for example, by 90°, it comes to the state as shown in FIG. 26B. In the state of FIG. 26B, when only gear G6 was rotated counterclockwise, for example, by 90°, it comes to the state as shown in FIG. 26C.

In the state of FIG. 26C, the orientation of the first light reflecting mirror 11' is the same as that in the FIG. 26A.

Accordingly, it is possible to make the first light reflecting mirror 11' perform a circular motion including a reciprocation in the direction of arrow X in FIGS. 26A to 26C (constant orientation, circular locus motion) by rotating gear G6 by 180° during the time when the arm is rotated by 90°.

Modified Example

Examples of the present invention are described above in detail. However, the scope of the present invention is not restricted by no means to the Examples, and various modifications can be introduced thereto within the range of the gist of the present invention defined in the claims below. Examples of the modifications of the present invention are described as follows:

(H01) Apparatus can be constructed such that the reflected light from the third light reflecting member shown in Example 1 is further entered in the fourth, fifth, ~ and nth light reflecting members in turn, and reflected by the last nth light reflecting member in the same optical path as that of the incident lights to the opposite direction.

(H02) In each of the Examples described above, when the reentering position of an optical beam in beam splitter B becomes constant, it is possible to make the second light reflecting member or the third light reflecting member perform a motion subordinate to eccentric rotation, instead of the first light reflecting member. Further, when the fourth to nth light reflecting member are used, it is possible to make any one of the first to nth light reflecting member perform a motion subordinate to eccentric rotation.

(H03) In Example 1, when the reentering position of an optical beam in beam splitter B becomes constant, it is possible to integrally connect, for example, the first light reflecting member 11' and the second light reflecting member 23, and make them integrally perform a motion subordinate to eccentric rotation. Further, it is possible to integrally connect the first light reflecting member and the third light reflecting member, and make them simultaneously perform a motion subordinate to eccentric rotation.

(H04) In Example 11 shown in the FIG. 23 and Example 12 shown in FIG. 24, it is possible to provide a rotating shaft for attaching balancer with its end protruding upward, on the upper surface of three upper rotating members 29 and at a position which is symmetrical to the circular locus moving shafts 28 and 28' described above with respect to the shaft (symmetrical to the rotating shaft of rotating member 29 with respect to the shaft), and attach the balancer to the rotating shaft. Also, it is possible to attach the balancer even on the lower surface of lower rotating member 29 in the same manner as the upper surface of the upper rotating member 29.

Apparatus for reflecting a light and increasing or decreasing the length of a optical path on a cycle of the present invention produces such effects as follows:

(E01) Position of a light reflecting members in the direction along the optical path can efficiently be varied by the motion subordinate to eccentric rotation of the light reflecting member.

(E02) Length of an optical path from the point where an optical beam is splitted by a beam splitter and caused to emerge therefrom to the point where the optical beam is reflected by a light reflecting member, and finally to the point where the reflected light reenters the beam splitter can be increased or decreased on a cycle at a high speed.

What is claimed is:

1. An apparatus for reflecting a light and increasing or decreasing the length of an optical paths, comprising:

at least one light reflecting member having one or more mirrors to reflect an incident light, and supported so as to perform a circular locus motion with the orientation of the light reflecting member being constant, said circular locus motion including a motion in which the light reflecting member is moved in a receding direction and approaching direction with respect to the incident light, means for generating a turning effect for moving the light reflecting member, and means for converting turning effect into circular locus motion to make the light reflecting member perform the circular locus motion with the orientation of the light reflecting member being constant, by the turning effect.

2. An apparatus for reflecting a light and increasing or decreasing the length of an optical paths comprising:

at least one light reflecting member having one or more mirrors to reflect an incident light, in which member a hole used for fitting a cam and having a center line extending in the direction crossing the optical axis of the incident light is formed, an eccentric cam shaft having an eccentric cam supported so as to be rotatable around an axial line which is eccentric from the center line by a prescribed eccentric distance r, and rotatably fitted in the hole used for fitting the cam, and means for rotating the eccentric cam shaft, said eccentric cam being fitted in said hole such that the light reflecting member performs a motion subordinate to eccentric rotation, including a reciprocating motion of a prescribed stroke, in the direction of the incident light with the orientation of the light reflecting member being constant, when the eccentric cam shaft is continuously rotated.

3. An apparatus for reflecting a light and increasing or decreasing the length of an optical path, comprising:

a beam splitter for splitting an incident light into a reflecting light and a transmitting light, and causing both of the lights to emerge, at least one light reflecting member to reflect one of the emerged lights from the beam splitter and to reenter the light in the beam splitter in the direction opposite to the emerging direction of the emerged light, said light reflecting member being supported so as to perform a circular locus motion with the orientation of the light reflecting member being constant, said circular locus motion including a motion in which the light reflecting member is moved in a receding direction and approaching direction with respect to the beam splitter, means for generating a turning effect for moving the light reflecting member, and means for converting turning effect into circular locus motion to make the light reflecting member perform the circular locus motion with the orientation of the light reflecting member being constant, by the turning effect.

4. An apparatus for reflecting a light and increasing or decreasing the length of an optical paths comprising:

a beam splitter for splitting an incident light into a reflecting light and a transmitting light, and causing both of the lights to emerge, at least one light reflecting member to reflect one of the emerged lights from the beam splitter and to reenter the light in the beam splitter in the direction opposite to the emerging direction of the emerged light, said light reflecting member having one or more mirrors to reflect the incident light entering therein, in said light reflecting member, a hole used for fitting a cam and having a center line extending in the direction crossing the optical axis of the incident light being formed, an eccentric cam shaft having an eccentric cam supported so as to be rotatable around an axial line which is eccentric from the center line by a prescribed eccentric distance r, and rotatably fitted in the hole used for fitting the cam, and means for rotating the eccentric cam shaft, said eccentric cam being fitted in said hole such that the light reflecting member performs a motion subordinate to eccentric motion, including a reciprocating motion of a prescribed stroke, in the direction of the incident light with the orientation of the light reflecting member being constant, when the eccentric cam shaft is continuously rotated.

5. The apparatus for reflecting a light and increasing or decreasing the length of an optical path according to claim 4, wherein said apparatus is provided with a first light reflecting member which reflects a light and emits it as a first reflected light in a prescribed direction when the light emerged from the beam splitter enters, and a second light reflecting member which reflects the first reflected light and emits it as a second reflected light to the direction opposite to that of the first reflected light when the first reflected light enters therein.

6. The apparatus for reflecting a light and increasing or decreasing the length of an optical path according to claim 4, wherein said apparatus is provided with a first light reflecting member and a second light reflecting member, in each of which a hole for fitting a cam and having the center line extending in the direction crossing the optical axis of the incident light entering therein is formed.

7. The apparatus for reflecting a light and increasing or decreasing the length of an optical path according to claim 4, wherein said apparatus is constructed such that an optical beam is reentered in a beam splitter through the same optical path as that for one of the emerged lights in the direction opposite to that of the emerging light.

8. The apparatus for reflecting a light and increasing or decreasing the length of an optical path according to claim 4, wherein said apparatus is provided with a second light reflecting member for reflecting a first reflected light, and emitting the reflected first reflected light as a second reflected light of the same optical path in the direction opposite to that of the first reflected light.

* * * * *